US006588573B1

(12) United States Patent
Ogura et al.

(10) Patent No.: US 6,588,573 B1
(45) Date of Patent: Jul. 8, 2003

(54) ESCALATOR WITH HIGH SPEED INCLINED SECTION

(75) Inventors: Manabu Ogura, Tokyo (JP); Takashi Yumura, Tokyo (JP); Yasumasa Haruta, Tokyo (JP); Tatsuya Yoshikawa, Tokyo (JP); Shinji Nagaya, Tokyo (JP); Joichi Nakamura, Fukuoka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/273,325

(22) Filed: Oct. 18, 2002

(30) Foreign Application Priority Data

Jan. 23, 2002 (JP) ....................................... 2002-014654

(51) Int. Cl.[7] ................................................ B65G 21/12
(52) U.S. Cl. ....................................................... 198/334
(58) Field of Search ................................ 198/321, 326, 198/334

(56) References Cited

U.S. PATENT DOCUMENTS

| | | | | |
|---|---|---|---|---|
| 3,834,520 A | * | 9/1974 | Patin | 198/334 |
| 4,066,161 A | * | 1/1978 | Michalon et al. | 198/334 |
| 4,240,537 A | * | 12/1980 | Dunstan | 198/334 |
| 4,284,191 A | * | 8/1981 | Lavau | 198/334 X |
| 4,330,057 A | * | 5/1982 | Binns | 198/334 |
| 4,462,514 A | * | 7/1984 | Dunstan | 198/334 |

FOREIGN PATENT DOCUMENTS

| | | |
|---|---|---|
| JP | 51-116586 | 10/1976 |

* cited by examiner

*Primary Examiner*—James R. Bidwell
(74) *Attorney, Agent, or Firm*—Leydig, Voit & Mayer, Ltd.

(57) ABSTRACT

An escalator with a high speed inclined section in which a position of a link connection point is determined by the following equations:

$$X_M = X_1 + L_1 \cos\{\beta - \gamma\},$$

and $$Y_M = Y_1 + L_1 \sin\{\beta - \gamma\}$$

(where $\beta = \tan^{-1}\{(Y_1 - Y_2)/(X_1 - X_2)\}$; $\gamma = \cos^{-1}\{(L_1^2 - L_2^2 + W^2)/2L_1W\}$; $W = \sqrt{\ }\{(X_1 - X_2) + (Y_1 - Y_2)\}$; $X_M$: horizontal coordinate of the link connection point; $Y_M$: vertical coordinate of the link connection point; $L_1$: a distance from axis of an upper-step-side step link roller shaft to the link connection point; and $L_2$: a distance from axis of a lower-step-side step link roller shaft to the link connection point).

7 Claims, 11 Drawing Sheets

ESCALATOR WITH HIGH SPEED INCLINED SECTION

BACKGROUND OF THE INVENTION

1. Field of the Invention

This invention relates to an escalator with a high speed inclined section in which the steps move faster in the intermediate inclined section than in the upper and lower landing sections.

2. Description of the Related Art

FIG. 11 is a side view showing a main portion of the conventional escalator with a high speed inclined section disclosed, for example, in JP 51-116586 A. In the drawing, a main frame 1 is provided with a plurality of steps 2 connected in an endless fashion and circulated. Each step 2 has a tread 3, a riser 4 formed by bending a lower-step-side end portion of the tread 3, a step link roller shaft 5 extending in the width direction of the tread 3, a pair of step link rollers 6 rotatable around the step link roller shaft 5, a trailing roller shaft 7 extending parallel to the step link roller shaft 5, and a pair of trailing rollers 8 rotatable around the trailing roller shaft 7.

The step link roller shafts 5 of the adjacent steps 2 are connected to each other by a pair of link mechanisms 9. Each link mechanism 9 is provided with an auxiliary roller 10.

The main frame 1 is provided with a pair of main tracks 11 forming a loop track for the steps 2 and guiding the step link rollers 6, a pair of trailing tracks 12 for guiding the trailing rollers 8 and controlling the attitude of the steps 2, and a pair of auxiliary tracks 13 for guiding the auxiliary rollers 10 and varying the distance between the adjacent steps 2.

In this conventional escalator with a high speed inclined section, the auxiliary roller 10 is displaced with respect to the step link roller shaft 5 according to the configuration of the auxiliary tracks 13, whereby the link mechanism 9 undergoes deformation so as to fold and stretch, varying the distance between the adjacent step link roller shafts 5. Due to this arrangement, the moving speed of the steps 2 is varied according to the position in the loop track. That is, in the upper and lower landing sections, they are run at low speed, and in the intermediate inclined section, they are run at high speed.

In the conventional escalator with a high speed inclined section constructed as described above, the riser 4 has a flat configuration, whereas the auxiliary track 13 in the speed changing region has a smooth arcuate configuration. Thus, during the process in which adjacent steps 2 undergo a change in difference in level, the end portion of the tread 3 is not displaced along a locus extending along the surface of the riser 4 of the upper adjacent step 2, and either interferes with the riser 4 or allows a gap to be generated between it and the riser 4.

SUMMARY OF THE INVENTION

This invention has been made in view of the above problem in the prior art. It is an object of this invention to provide an escalator with a high speed inclined section in which during the process in which the adjacent steps undergo a change in level difference, it is possible to prevent both interference of the tread with the riser of the adjacent step and generation of a gap between the riser and the tread.

To this end, according to one aspect of the present invention, there is provided an escalator with a high speed inclined section, wherein when axes of adjacent step link roller shafts are in an upper speed changing section, and, assuming that relative coordinates in horizontal and vertical directions of the axes of the step link roller shafts are ($X_S$, $Y_S$), that radius of curvature of movement locus of the axis of the step link roller shaft in an upper curved section is $R_1$, and that a point vertically spaced apart by $-R_1$ from a border point which is in the movement locus of the axis of the step link roller shaft and between an upper landing section and the upper curved section is the origin of a coordinate system, when $Y_s$ is in the following range:

$$-R_1+\sqrt{(R_1^2-X_S^2)} \leqq Y_s < 0$$

a relationship between relative positions of the adjacent step link rollers in the upper speed changing section, horizontal coordinate $X_1$ of the axis of the upper-step-side step link roller shaft, horizontal coordinate $Y_1$ of the axis of the upper-step-side step link roller shaft, horizontal coordinate $X_2$ of the axis of the lower-step-side step link roller shaft, and horizontal coordinate $Y_2$ of the axis of the lower-step-side step link roller shaft can be expressed by the following equations:

$$X_1=-X_s+\sqrt{(-2R_1 \cdot Y_S-Y_S^2)},$$

$$Y_1=R_1,$$

$$X_2=X_1+X_S,$$

and $$Y_2=Y_1+Y_S.$$

Also, a position of a link connection point is determined by the following equations:

$$X_M=X_1+L_1 \cos \{\beta-\gamma\},$$

and $$Y_M=Y_1+L_1 \sin \{\beta-\gamma\}$$

(where $\beta=\tan^{-1}\{(Y_1-Y_2)/(X_1-X_2)\}$;

$\gamma=\cos^{-1}\{(L_1^2-L_2^2+W^2)/2L_1W\}$;

$W=\sqrt{\{(X_1-X_2)^2+(Y_1-Y_2)^2\}}$;

$X_M$: the horizontal coordinate of the link connection point;

$Y_M$: the vertical coordinate of the link connection point;

$L_1$: the distance from the axis of the upper-step-side step link roller shaft to the link connection point; and $L_2$: the distance from the axis of the lower-step-side step link roller shaft to the link connection point).

According to another aspect of the present invention, there is provided an escalator with a high speed inclined section, wherein when axes of the adjacent step link roller shafts are in the upper speed changing section, and, assuming that relative coordinates in horizontal and vertical directions of the axes of the step link roller shafts are ($X_S$, $Y_S$), that radius of curvature of movement locus of the axis of the step link roller shaft in the upper curved section is $R_1$, that an inclination angle of the intermediate inclined section is $\alpha_m$, and that a point vertically spaced apart by $-R_1$ from a border point which is in the movement locus of the axis of the step link roller shaft and between the upper landing section and the upper curved section is the origin of a coordinate system, when $Y_s$ is in the following range:

$$R_1 \cos \alpha_m \sqrt{\{(R_1 \cos \alpha_m)^2+(2R_1 \sin \alpha_m \cdot X_S-X_S^2)\}} \leqq Y_S < -R_1+\sqrt{(R_1^2-X_S^2)}$$

a relationship between relative positions of the adjacent step link rollers in the upper speed changing section, horizontal coordinate $X_1$ of the axis of the upper-step-side step link roller shaft, horizontal coordinate $Y_1$ of the axis of the upper-step-side step link roller shaft, horizontal coordinate $X_2$ of the axis of the lower-step-side step link roller shaft, and horizontal coordinate $Y_2$ of the axis of the lower-step-side step link roller shaft can be expressed by the following equations:

$$X_1=[-p_1q_1+\sqrt{0}\{(p_1q_1)^2-(p_1^2+1)(q_1^2-R_1^2)\}]/(p_1^2+1),$$

$$Y_1=\sqrt{(R_1^2-X_1^2)},$$

$$X_2=X_1+X_S,$$

and $$Y_2=Y_1+Y_S$$

(where, $p_1=X_S/Y_S$, and $q_1=(X_S^2+Y_S^2)/2Y_S$).

Also, the position of the link connection point is determined by the following equations:

$$X_M=X_1+L_1\cos\{\beta-\gamma\},$$

and $$Y_M=Y_1+L_1\sin\{\beta-\gamma\}.$$

According to a still further aspect of the present invention, there is provided an escalator with a high speed inclined section, wherein when axes of the adjacent step link roller shafts are in the upper speed changing section, and, assuming that relative coordinates in horizontal and vertical directions of the axes of the step link roller shafts are $(X_S, Y_S)$, that radius of curvature of movement locus of the axis of the step link roller shaft in the upper curved section is $R_1$, that an inclination angle of the intermediate inclined section is $\alpha_m$, and that a point vertically spaced apart by $-R_1$ from a border point which is in the movement locus of the axis of the step link roller shaft and between the upper landing section and the upper curved section is the origin of a coordinate system, when $Y_s$ is in the following range:

$$-X_S\tan\alpha_m\leq Y_s<R_1\cos\alpha_m-\sqrt{\{(R_1\cos\alpha_m)^2+(2R_1\sin\alpha_m\cdot X_S-X_S^2)\}}$$

a relationship between relative positions of the adjacent step link rollers in the upper speed changing section, horizontal coordinate $X_1$ of the axis of the upper-step-side step link roller shaft, horizontal coordinate $Y_1$ of the axis of the upper-step-side step link roller shaft, horizontal coordinate $X_2$ of the axis of the lower-step-side step link roller shaft, and horizontal coordinate $Y_2$ of the axis of the lower-step-side step link roller shaft can be expressed by the following equations:

$$X_1=[-p_2s-\sqrt{\{(p_2s)^2-(p_2^2+1)(s^2-R^2)\}}]/(p_2^2+1),$$

$$Y_1=\sqrt{(R_1^2-X_1^2)},$$

$$X_2=X_1+X_S,$$

and $$Y_2=Y_1+Y_S$$

(where, $p_2=-\tan\alpha_m$, $q_2=R_1(\cos\alpha_m+\sin\alpha_m\cdot\tan\alpha_m)$, and $s=p_2X_s+q_2-Y_S$).

Also, the position of the link connection point is determined by the following equations:

$$X_M=X_1+L_1\cos\{\beta-\gamma\},$$

and $$Y_M=Y_1+L_1\sin\{\beta-\gamma\}.$$

According to a still further aspect of the present invention, there is provided an escalator with a high speed inclined section, wherein when axes of the adjacent step link roller shafts are in the lower speed changing section, and, assuming that relative coordinates in horizontal and vertical directions of the axes of the step link roller shafts are $(X_S, Y_S)$, that radius of curvature of the movement locus of the axis of the step link roller shaft in the lower curved section is $R_2$, and that a point vertically spaced apart by $R_2$ from a border point which is in the movement locus of the axis of the step link roller shaft and between the lower landing section and the lower curved section is the origin of a coordinate system, when $Y_s$ is in the following range:

$$-R_2+\sqrt{(R_2^2-X_S^2)}\leq Y_s<0$$

a relationship between relative positions of the adjacent step link rollers in the lower speed changing section, horizontal coordinate $X_1$ of the axis of the upper-step-side step link roller shaft, horizontal coordinate $Y_1$ of the axis of the upper-step-side step link roller shaft, the horizontal coordinate $X_2$ of the axis of the lower-step-side step link roller shaft, and horizontal coordinate $Y_2$ of the axis of the lower-step-side step link roller shaft can be expressed by the following equations:

$$X_1=-\sqrt{(-2R_2\cdot Y_S-Y_S^2)},$$

$$Y_1=-\sqrt{(R_2^2-X_1^2)},$$

$$X_2=X_1+X_S,$$

and $$Y_2=Y_1+Y_S.$$

Also, the position of the link connection point is determined by the following equations:

$$X_M=X_1+L_1\cos\{\beta-\gamma\}),$$

and $$Y_M=Y_1+L_1\sin\{\beta-\gamma\}.$$

According to a still further aspect of the present invention, there is provided an escalator with a high speed inclined section, wherein when axes of the adjacent step link roller shafts are in the lower speed changing section, and, assuming that relative coordinates in the horizontal and vertical directions of the axes of the step link roller shafts are $(X_S, Y_S)$, that radius of curvature of movement locus of the axis of the step link roller shaft in the lower curved section is $R_2$, that an inclination angle of the intermediate inclined section is $\alpha_m$, and that a point vertically spaced apart by $R_2$ from a border point which is in the movement locus of the axis of the step link roller shaft and between the lower landing section and the lower curved section is the origin of a coordinate system, when $Y_s$ is in the following range:

$$R_2\cos\alpha_m-\sqrt{\{(R_2\cos\alpha_m)^2+(2R_2\sin\alpha_m\cdot X_sX_s^2)\}}\leq Y_s<-R_2+\sqrt{(R_2^2-X_s^2)}$$

a relationship between relative positions of the adjacent step link rollers in the lower speed changing section, horizontal coordinate $X_1$ of the axis of the upper-step-side step link roller shaft, horizontal coordinate $Y_1$ of the axis of the upper-step-side step link roller shaft, the horizontal coordinate $X_2$ of the axis of the lower-step-side step link roller shaft, and horizontal coordinate $Y_2$ of the axis of the lower-step-side step link roller shaft can be expressed by the following equations:

$$X_1=[-p_3q_3\sqrt{\{(p_3q_3)^2-(p_3^2+1)(q_3^2-R_2^2)\}}]/(p_3^2+1),$$

$$Y_1=\sqrt{(R_2^2-X_1^2)},$$

$$X_2=X_1+X_S,$$

and $$Y_2=Y_1+Y_S$$

(where, $p_3=X_S/Y_S$, and $q_3=(X_S^2+Y_S^2)/2Y_S$).

Also, the position of the link connection point is determined by the following equations:

$$X_M=X_1+L_1\cos\{\beta-\gamma\},$$

and $$Y_M=Y_1+L_1\sin\{\beta-\}.$$

According to a still further aspect of the present invention, there is provided an escalator with a high speed inclined section, wherein when axes of the adjacent step link roller shafts are in the lower speed changing section, and, assuming that relative coordinates in horizontal and vertical directions of the axes of the step link roller shafts are $(X_S, Y_S)$, that radius of curvature of movement locus of the axis of the step link roller shaft in the lower curved section is $R_2$, that an inclination angle of the intermediate inclined section is $\alpha_m$, and that a point vertically spaced apart by $R_2$ from a border point which is in the movement locus of the axis of the step link roller shaft and between the lower landing section and the lower curved section is the origin of a coordinate system, when $Y_s$ is in the following range:

$$-X_S\tan\alpha_m \leqq Y_s < R_2\cos\alpha_m-\sqrt{\{(R_2\cos\alpha_m)^2+(2R_2\sin\alpha_m\cdot X_s-X_s^2)\}}$$

a relationship between relative positions of the adjacent step link rollers in the lower speed changing section, horizontal coordinate $X_1$ of the axis of the upper-step-side step link roller shaft, horizontal coordinate $Y_1$ of the axis of the upper-step-side step link roller shaft, the horizontal coordinate $X_2$ of the axis of the lower-step-side step link roller shaft, and horizontal coordinate $Y_2$ of the axis of the lower-step-side step link roller shaft can be expressed by the following equations:

$$X_1=\{-(p_4q_4+p_4Y_S+X_S)+\sqrt{A_1}\}/(p_4^2+1),$$

$$A_1=(p_4q_4+p_4Y_S+X_S)^2-(p_4^2+1)\{(q_4+Y_S)^2-R_2^2+X_S^2\},$$

$$Y_1=p_4X_1+q_4,$$

$$X_2=X_1+X_S,$$

and $$Y_2=Y_1+Y_S$$

(where, $p_4=-\tan\alpha_m$, and $q_4=-R_2(\cos\alpha_m+\sin\alpha_m\cdot\tan\alpha_m)$).

Also, the position of the link connection point is determined by the following equations:

$$X_M=X_1+L_1\cos\{\beta-\gamma\},$$

and $$Y_M=Y_1+L_1\sin\{\beta-\gamma\}.$$

DETAILED DESCRIPTION OF THE PREFERRED EMBODIMENTS

Embodiments of this invention will now be described with reference to the drawings.

Embodiment 1

Figure 1:
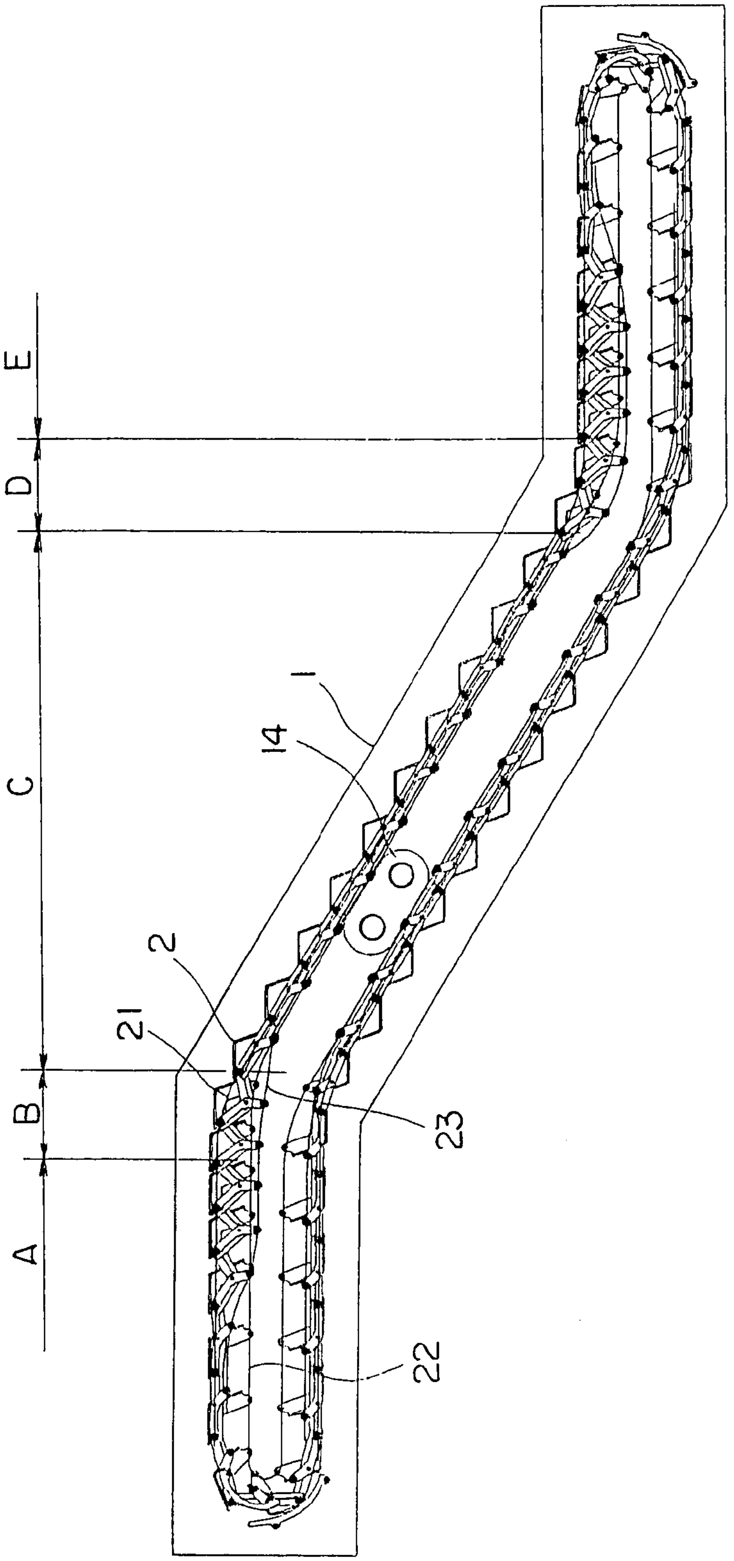
FIG. 1 is a side view of an escalator with a high speed inclined section according to Embodiment 1 of this invention.

FIG. 1 is a side view of an escalator with a high speed inclined section according to Embodiment 1 of this invention. In the drawing, a main frame 1 is provided with a plurality of steps 2 connected together in an endless fashion. The steps 2 are driven by a drive unit 14 and circulated. The main frame 1 is provided with a pair of main tracks 21 forming a loop track for the steps 2, a pair of trailing tracks 22 for controlling the attitude of the steps 2, and a pair of auxiliary tracks 23 for varying the distance between the adjacent steps 2.

The loop track for the steps 2 formed by the main tracks 21 has a forward path section, a backward path section, an upper reversing section, and a lower reversing section. Further, the forward path section of the loop track includes a horizontal upper landing section (upper horizontal section) A, an upper curved section B constituting an upper speed changing section, an intermediate inclined section (fixed inclination section) C having a fixed inclination angle, a lower curved section D constituting a lower speed changing section, and a horizontal lower landing section (lower horizontal section) E.

The intermediate inclined section C is situated between the upper landing section A and the lower landing section E. The upper curved section B is situated between the upper landing section A and the intermediate inclined section C. The lower curved section D is situated between the lower landing section E and the intermediate inclined section C.

Figure 2:
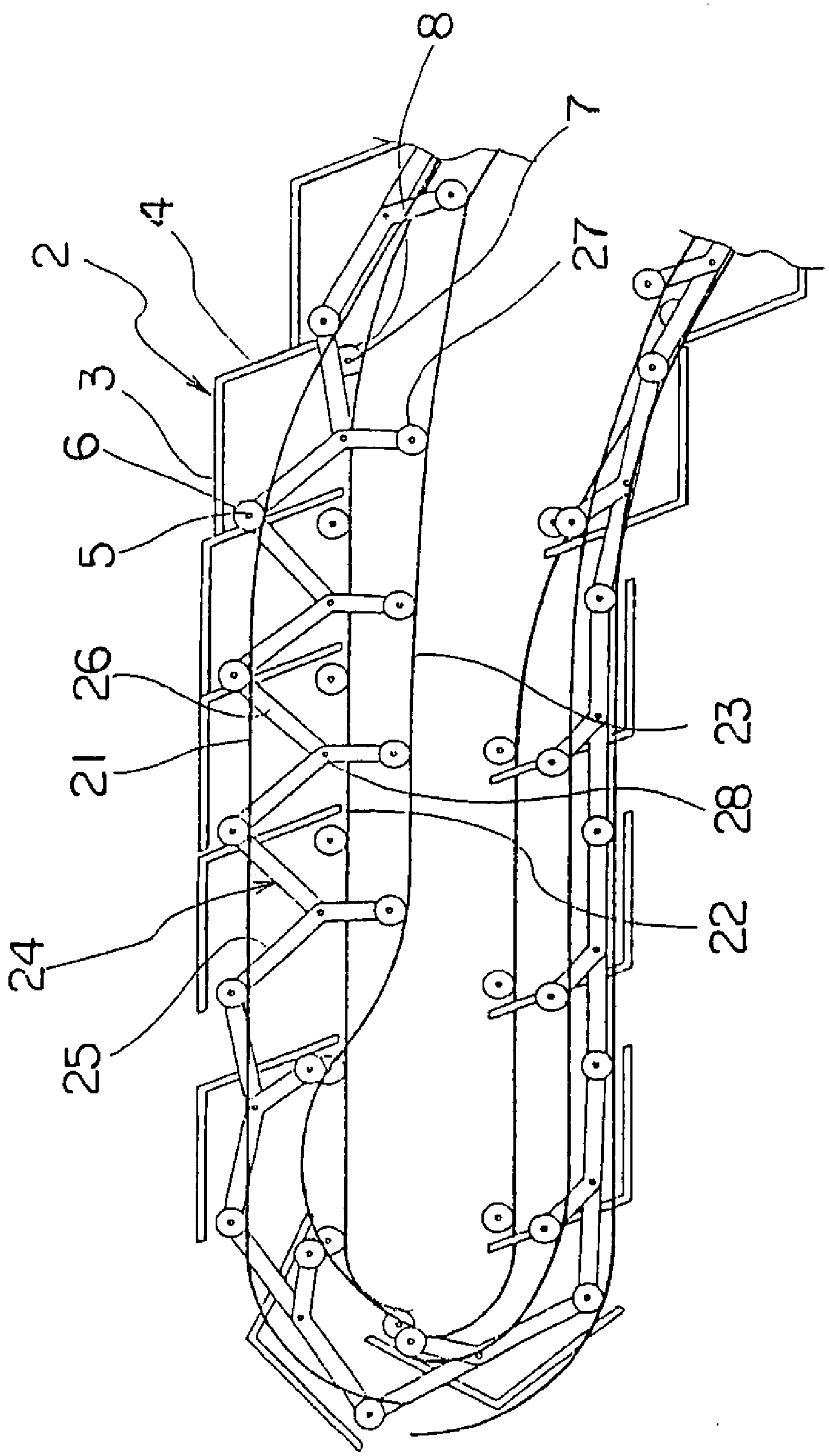
FIG. 2 is an enlarged side view of a portion around an upper reversing section of FIG. 1.

FIG. 2 is an enlarged side view of the portion around the upper reversing section of FIG. 1. Each step 2 has a tread 3 for carrying a passenger, a riser 4 formed by bending the lower-step-side end portion of the tread 3, a step link roller shaft 5 extending in the width direction of the tread 3, a pair of step link rollers 6 rotatable around the step link roller shaft 5, a trailing roller shaft 7 extending parallel to the step link roller shaft 5, and a pair of trailing rollers 8 rotatable around the trailing roller shaft 7. The step link rollers 6 roll on the main tracks 21. The trailing rollers 8 roll on the trailing tracks 22.

The step link roller shafts 5 of the adjacent steps 2 are connected to each other by a pair of link mechanisms (bending links) 24. Each link mechanism 24 has first and second links 25 and 26.

One end portion of the first link 25 is rotatably connected to the step link roller shaft 5. At the other end of the first link 25, there is provided a rotatable auxiliary roller 27. The auxiliary roller 27 rolls on an auxiliary track 23. One end portion of the second link 26 is rotatably connected to a link connection point in the middle portion of the first link 25 through a shaft 28. Further, the other end portion of the second link 26 is rotatably connected to the step link roller shaft 5 of the step 2 adjacent on the lower-step side.

The first link 25 is bent at the link connection point to exhibit a V-shaped configuration. The second link 26 has a linear configuration.

Due to the guidance of the auxiliary roller 27 by the auxiliary track 23, the link mechanism 24 is changed so as to expand and contract, varying the distance between the step link roller shafts 5, that is, the distance between the adjacent steps 2. In other words, the line of the auxiliary track 23 is designed such that the distance between the adjacent steps 2 varies.

Next, the operation of this escalator will be described. In the forward path section of the loop track for the steps 2, the distance between the step link roller shafts 5 in the upper landing section A and the lower landing section E, is the smallest. When, from this state, the distance between the main track 21 and the auxiliary track 23 is diminished, the angle made by the first and second links 25 and 26 increases, and the distance between the step link roller shafts 5 increases. In the intermediate inclined section C, the distance between the main track 21 and the auxiliary track 23 is minimum, and the distance between the step link roller shafts 5 is maximum.

The speed of the steps 2 is varied by varying the distance between the step link roller shafts 5. That is, in the upper and lower landing sections A and E where the passenger gets on or off, the distance between the step link roller shafts 5 is minimum, and the steps 2 are moved at low speed. In the intermediate inclined section C, the distance between the step link roller shafts 5 is maximum, and the steps 2 are moved at high speed. Further, in the upper curved section B and the lower curved section D, the distance between the step link roller shafts 5 is varied, and the steps 2 are accelerated or decelerated.

Figure 3:
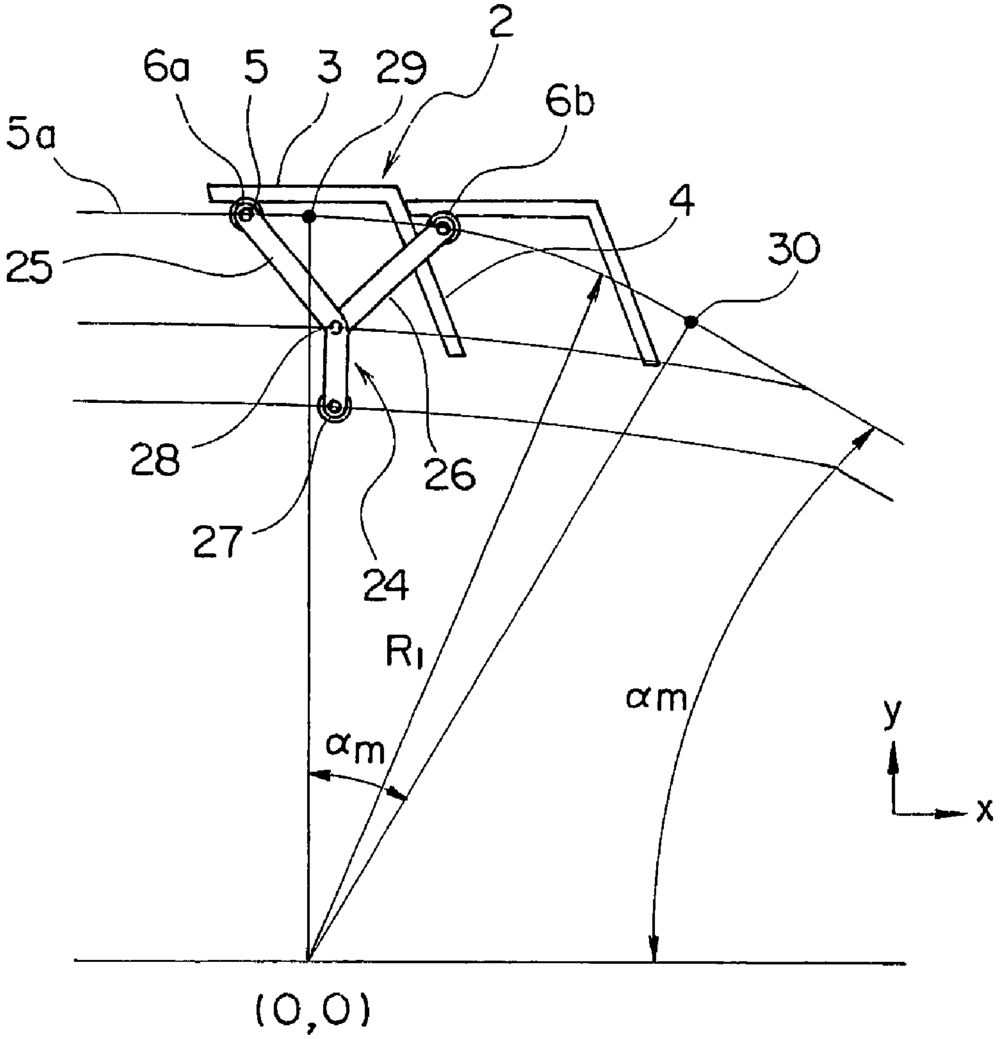
FIG. 3 is an explanatory diagram showing movement locus of the axis of the step link roller shaft near an upper landing section and an upper curved section of FIG. 1.

Next, with reference to FIGS. 3 through 9, the method of setting the position of the link connection point according to Embodiment 1 will be described. FIG. 3 is an explanatory diagram showing the movement locus of the axis of the step link roller shaft 5 near the upper landing section A and the upper curved section B of FIG. 1. In the drawing, the radius of curvature of the movement locus of the axis of the step link roller shaft 5 in the upper curved section B is $R_1$. The origin of the coordinate system is the point spaced apart vertically (in the y-direction) by $-R_1$ from the border point 29 in the movement locus 3 of the axis of the step link roller shaft 5 and between the upper landing section A and the upper curved section B.

Here, suppose the axis of the step link roller 6*a* of the upper-step side step 2 (the axis of the step link roller shaft 5) is situated in the upper landing section A, and its coordinates are $(X_1, X_2)$. Further, suppose the axis of the step link roller 6*b* of the lower-step side step 2 (the axis of the step link roller shaft 5) is situated in the upper curved section B, and its coordinates are $(X_2, X_2)$. Further, suppose the coordinates of the relative position of the axis of the step link roller 6*b* of the lower-step side step with respect to the axis of the step link roller 6*a* of the upper-step side step 2 are $(X_s, Y_s)$ The movement locus of the axis of the step link roller 6*a* in the upper landing section A at this time is expressed as follows:

$$y=R_1$$

Thus, the coordinate relationship of the axis of the upper-step-side step link roller 6*a* is expressed as follows:

$$Y_1=R_1 \quad (1)$$

In the upper curved section B, the following equation holds true:

$$y^2=R_1^2-x^2$$

The coordinates of the axis of the step link roller 6*b* of the lower-step side step are expressed as follows:

$$(X_2, Y_2)=(X_1+X_S, Y_1+Y_S)$$

Thus, the coordinate relationship of the axis of the lower-step-side step link roller 6*b* is expressed as follows:

$$(Y_1, Y_S)^2=R_1^2-(X_1+X_S)^2 \quad (2)$$

Here, the $(X_1, Y_1)$ satisfying both equations (1) and (2) are the coordinates of the axis of the upper-step-side step link roller 6*a* when the relative position of the axis of the step link roller 6*b* of the lower-step-side step 2 with respect to the axis of the step link roller 6*a* of the upper-step-side step 2 is $(X_s, Y_s)$. Thus, from the simultaneous equations of (1) and (2), $X_1$ is obtained.

First, when equation (1) is substituted in equation (2) for modification, the following equation (3) is obtained:

$$X_1^2+2X_SX_1+(X_S^2+2R_1Y_S+Y_S^2)=0 \quad (3)$$

Next, equation (3) is solved with respect to $X_1$ from the quadratic equation formula.

$$X_1=-X_S+\sqrt{(-2R_1 \cdot Y_S+Y_S^2)} \quad (4)$$

From equation (3), the Y coordinate is as follows:

$$Y_1=R$$

The coordinates of the axis of the step link roller 6*b* of the lower-step-side step are $(X_1+X_s, Y_1+Y_s)$.

Note that this relationship is applicable in the region between the state when the axis of the lower-step-side step link roller 6*b* is positioned at the border point 29 and the state when the axis of the upper-step-side step link roller 6*a* is positioned at the border point 29 (the state in which the axis of the upper-step-side step link roller shaft 5 is situated in the upper landing section A and in which the axis of the lower-step-side step link roller shaft 5 is situated in the upper curved section B). The state in which the axis of the lower-step-side step link roller 6*b* is positioned at the border point 29 corresponds to the upper-landing section-A side limit point of the upper curved section B to which equation (2) is applicable. Further, the state in which the axis of the upper-step-side step link roller 6*a* is positioned at the border point 29 corresponds to the upper-curved section-B-side limit point of the upper landing section A to which equation (1) is applicable.

When the axis of the lower-step-side step link roller 6*b* is situated at the border point 29 between the upper landing section A and the upper curved section B, $Y_1=R_1$ and $(X_1+X_s)=0$ in equation (2), so that $Y_s$ is obtained by substituting them into equation (2). That is, $$(R_1+Y_S)^2=R_1^2$$

$$Y_S(Y_S+2R_1)=0$$

Thus, $$Y_S=0(Y_S=-2R_1 \text{ is unsuitable}) \quad (6)$$

When the axis of the upper-step-side step link roller 6*a* is positioned at the border point 29 between the upper landing section A and the upper curved section B, $X_1=0$ and $Y_1=R_1$ in equation (2), so that these are substituted into equation (2) to obtain $Y_s$. That is, $$(R_1+Y_S)^2=R_1^2-X_S^2$$

$$Y_S^2+2R_1Y_S+X_S^2=0$$

Thus, $$Y_S=-R_1+\sqrt{(R_1^2-X_S^2)}$$

$$(Y_S=-R_1-\sqrt{(R_1^2-X_S^2)} \text{ is unsuitable}) \quad (7)$$

Thus, equation (4) is applied when the relative position $Y_s$ in the y-direction of the axis of the step link roller 6*b* of the lower-step-side step 2 with respect to the axis of the step link roller 6*a* of the upper-step-side step 2 is in the following region:

$$-R1+\sqrt{(R_1^2-X_S^2)}\leqq Y_S<0$$

Figure 4:
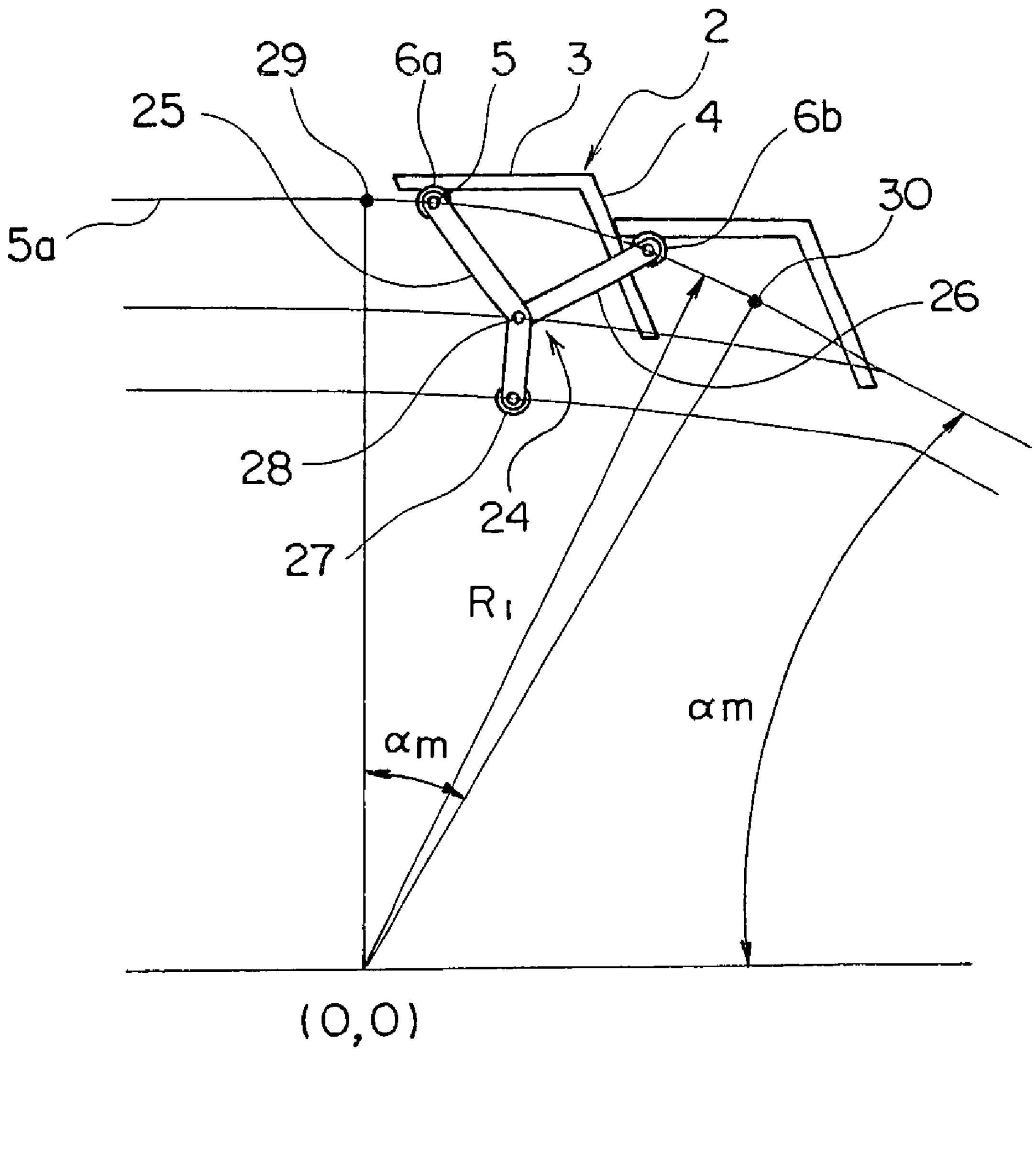
FIG. 4 is an explanatory diagram showing the movement locus of the axis of the step link roller shaft in a section nearer to an intermediate inclined section than in FIG. 3.

FIG. 4 is an explanatory diagram showing the movement locus of the axis of the step link roller shaft 5 in a section nearer to the intermediate inclined section C than in FIG. 3. In the drawing, the axis of the step link roller 6*a* of the upper-step-side step 2 and the axis of the step link roller 6*b* of the lower-step-side step 2 are both situated in the upper curved section B, their respective coordinates being $(X_1, X_2)$ and $(X_2, X_2)$. Further, the relative position of the axis of the step link roller 6*b* of the lower-step-side step 2 with respect to the axis of the step link roller 6*a* of the upper-step-side step 2 is $(X_s, Y_s)$.

The movement locus of the axes of step link rollers 6*a* and 6*b* in the upper curved section B at this time can be expressed as follows:

$$y^2=R_1^2-x^2$$

Thus, the coordinates of the axis of the step link roller 6*a* on the upper step side are in the following relationship:

$$Y_1^2=R_1^2-x^2 \quad (8)$$

$$Y_1=\sqrt{(R_1^2-X_1^2)}$$

$$(Y_1=-\sqrt{(R_1^2-X_1^2)} \text{ is unsuitable}) \quad (8)'$$

The coordinates of the axis of the lower-step-side step link roller 6*b* is in the following relationship:

$$(Y_1+Y_S)^2=R_1^2-(X_1+X_S)^2 \quad (9)$$

Here, the $(X_1, Y_1)$ satisfying both equations (8) and (9) are the coordinates of the upper-step-side step link roller 6*a* when the relative position of the axis of the step link roller 6*b* of the lower-step-side step 2 with respect to the axis of the step link roller 6*a* of the upper-step-side step 2 is $(X_s, Y_s)$ Thus, from the simultaneous equations of (8) and (9), $X_1$ is obtained.

First, equation (9) is expanded.

$$Y_1^2+2Y_S\cdot Y_1+Y_S^2=R_1^2-X_1^2-2X_S\cdot X_1-X_S^2 \quad (9)'$$

Next, equation (8)' is substituted into equation (9)'.

$$Y_1^2+2Y_S\sqrt{(R_1^2-X_1^2)}+Y_S^2=Y_1^2+2X_S\cdot X_1-X_S^2$$

$$2Y_S\sqrt{(R_1^2-X_1^2)}=-2X_S\cdot X_1-(X_S^2+Y_S)$$

$$\sqrt{(R_1^2-X_1^2)}=-(X_S/Y_S)X_1-(X_S^2+Y_S^2)/2Y_S$$

Here, assuming that $p_1=-X_S/Y_S$, $q_1=-(X_S^2+Y_S^2)/2Y_S$, $$\sqrt{(R_1^2-X_1^2)}=p_1X_1+q_1$$

By squaring both sides for modification, the following equation is obtained:

$$(p_1^2+1)X_1^2+2p_1q_1\cdot X_1+(q_1^2-R_1^2)=0 \quad (10)$$

By solving equation (10) with respect to $X_1$ by the quadratic equation formula, the following equation is obtained:

$$X_1=[-p_1q_1+\sqrt{\{(p_1q_1)^2-(p_1^2+1)(q_1^2-R_1^2)\}}]/(p_1^2+1) \quad (11)$$

$$(X_1=[-p_1q_1-\sqrt{\{(p_1q_1)^2-(p_1^2+1)\ (q_1^2-R_1^2)\}}]/(p_1^2+1) \text{ is unsuitable})$$

Note $p_1=X_S/Y_S$, and $q_1=(X_S^2+Y_S^2)/2Y_S$(sign omissible).

From equation (3), the Y-coordinate thereof is as follows:

$$Y_1=\sqrt{(R_1^2-X_1^2)}$$

The coordinates of the axis of the step link roller 6*b* of the lower-step-side step are $(X_1+X_s, Y_1+Y_s)$ Note that this relationship is applicable in the region between the state when the axis of the upper-step-side step link roller 6*a* is positioned at the border point 29 and the state when the axis of the lower-step-side step link roller 6*b* is positioned at the border point 30 between the upper curved section B and the intermediate inclined section C (the state in which the axis of the upper-step-side step link roller shaft 5 and the axis of the lower-step-side step link roller shaft 5 are both situated in the upper curved section B). The state in which the axis of the upper-step-side step link roller 6*a* is positioned at the border point 29 corresponds to the upper-landing section-A side limit point of the upper curved section B to which equation (8) is applicable. The state in which the axis of the lower-step-side step link roller 6*b* is positioned at the border point 30 corresponds to the intermediate-inclined section-C-side limit point of the upper curved section B to which equation (9) is applicable.

The coordinates of the border point 30 between the upper curved section B and the intermediate inclined section Care ($R_1$sin α, $R_1$cos $\alpha_m$), so that when the axis of the lower-step-side step link roller 6*b* is positioned at the border point 30, the following equations hold true:

$$X_1=R_1\sin\alpha_m-X_S \quad (12)$$

$$Y_1=R_1\cos\alpha_m-Y_S \quad (13)$$

Equations (12) and (13) are substituted into equation (8) for modification as follows:

$$(R_1\cos\alpha_m-Y_S)^2=R_1^2-R_1\sin\alpha_m-X_S)^2$$

$$R_1^2\cos^2\alpha_m 2R_1\cos\alpha_m\cdot Y_S+Y_S+Y_S^2$$

$$=R_1^2-R_1^2\sin^2\alpha_m+2R_1\sin\alpha_m\cdot X_S-X_S^2$$

$$Y_S^2-2R_1\cos\alpha_m\cdot Y_S-(2R_1\sin\alpha_m\cdot X_S-X_S^2)=0 \quad (14)$$

Equation (14) is solved with respect to $Y_s$ by the quadratic equation formula to obtain the $Y_s$ when the axis of the lower-step-side step link roller 6*b* is positioned at the border point 30 as follows:

$$Y_S=R_1\cos\alpha_m-\sqrt{\{(R_1\cos\alpha_m)^2+(2R_1\sin\alpha_m\cdot X_S-X_S^2)\}} \quad (15)$$

$Y_S=R_1\cos\alpha_m+\sqrt{\{(R_1\cos\alpha_m)^2+(2R_1\sin\alpha_m\cdot X_S-X_S^2)\}}$ is unsuitable.)

The value of $Y_s$ when the axis of the upper-step-side step link roller 6*a* is positioned at the border point 29 between the upper landing section A and the upper curved section B has already been obtained from equation (7), so that the equation is adopted; equation (11) is applied when the relative position $Y_s$ in the y-direction of the axis of the step link roller 6*b* of the lower-step-side step with respect to the axis of the step link roller 6*a* of the upper-step-side step is in the:following range:

$$R_1\cos\alpha_m-\sqrt{\{(R_1\cos\alpha_m)^2+(2R_1\sin\alpha_m\cdot X_S-X_S^2)\}}==Y_S<-R_1+\sqrt{(R_1^2-X_S^2)}$$

Figure 5:
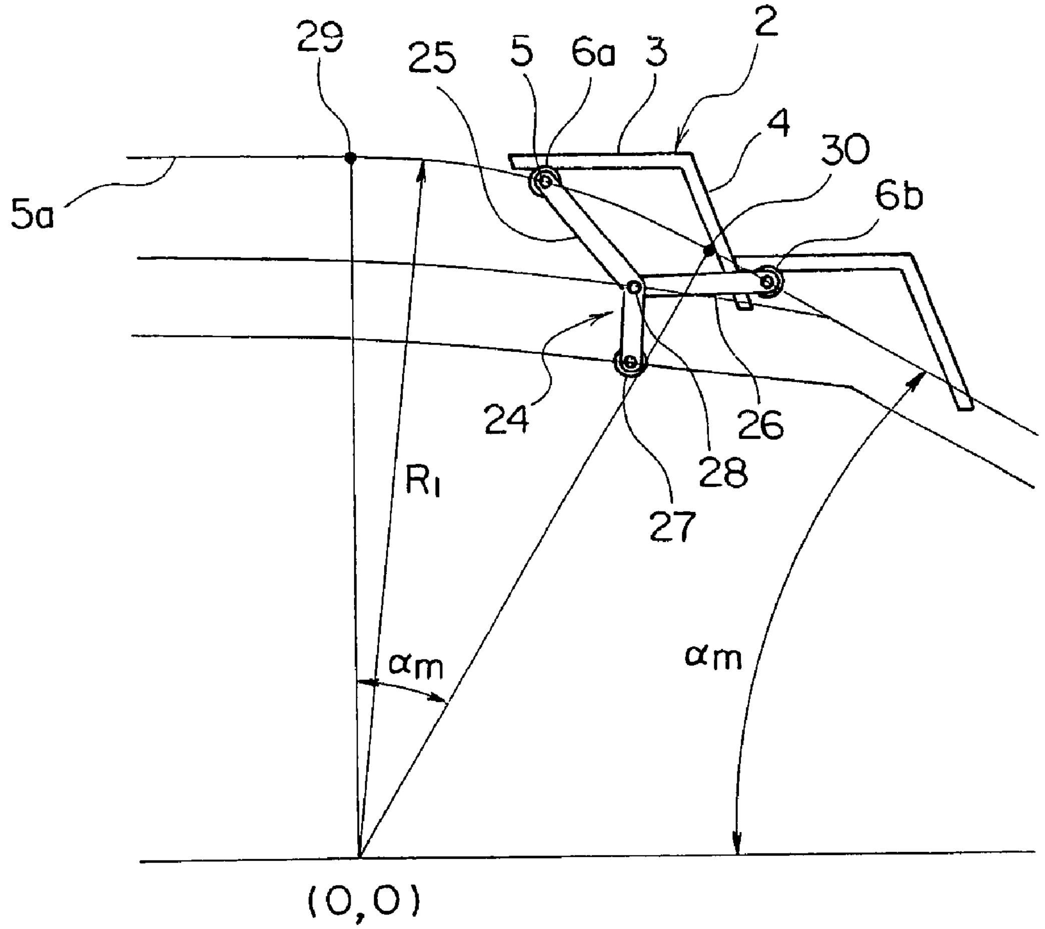
FIG. 5 is an explanatory diagram showing the movement locus of the axis of the step link roller shaft in a section nearer to the intermediate inclined section than in FIG. 4.

FIG. 5 is an explanatory diagram showing the movement locus of the axis of the step link roller shaft 5 in a section nearer to the intermediate inclined section C than in FIG. 4. Here, suppose the axis of the step link roller 6*a* of the step 2 on the upper step side is situated in the upper curved section B, with its coordinates being ($X_1$, $X_2$), that the axis of the step link roller 6*b* of the step 2 on the lower step side is situated in the intermediate inclined section C, with its coordinates being ($X_2$, $X_2$), and that the relative position of the axis of the step link roller 6*b* of the step 2 on the lower step side with respect to the axis of the step link roller 6*a* of the step 2 on the upper step side is ($X_s$, $Y_s$).

The movement locus of the axis of the step link roller 6*a* in the upper landing section A at this time can be expressed as follows:

$$y^2=R_1^2-X^2$$

Thus, the coordinates of the axis of the step link roller shaft on the upper step side are in the following relationship:

$$Y_1^2=R_1^2-X_1^2 \quad (16)$$

The straight line of the movement locus of the axis of the step link roller shaft in the intermediate inclined section C can be expressed as follows:

$$y=p_2x+q_2$$

Thus, the following equations are obtained:

$$(Y_1+Y_S)=p_2(X_1+X_S)+q_2 \quad (17)$$

$$Y_1=p_2(X_1+X_S)+(q_2-Y_S) \quad (17)'$$

This straight line passes the coordinates of the border point 30, (R sin $\alpha_m$, R cos $\alpha_m$), between the upper curved section B and the intermediate inclined section C and exhibits an incline p; here, it can be expressed as follows:

$$p_2=-\tan\alpha_m,\ q_2=R_1(\cos\alpha_m+\sin\alpha_m\cdot\tan\alpha_m)$$

Here, ($X_1$, $Y_1$) satisfying both equations (16) and (17) are the coordinates of the axis of the upper-step-side step link roller 6*a* when the relative position of the axis of the step link roller 6*b* of the lower-step-side step 2 with respect to the axis of the step link roller 6*a* of the upper-step-side step 2 is ($X_s$, $Y_s$) Thus, from the simultaneous equations of (16) and (17), $X_1$ is obtained.

First, both sides of equation (17)' are squared to obtain equation (18).

$$Y_1^2=\{p_2(X_1+X_S)\}^2+2p_2(X_1+X_S)(q_2-Y_S)+(q_2-Y_S)^2 \quad (18)$$

Next, equation (16) is substituted into equation (18) for modification.

$$R_1^2-X_1^2=\{p_2(X_1+X_S)\}^2+2p_2(X_1+X_S)(q_2-Y_S)+(q_2-Y_S)^2$$

$$(p_2^2+1)X_1^2+2p_2sX_1+(S^2-R_1^2)\}=0 \quad (19)$$

where $s=p_2X_S+q_2-Y_S$

Equation (19) is solved with respect to $X_1$ by using the quadratic equation formula.

$$X_1=[-p_2S-\sqrt{\{(p_2S)^2-(p_6^2+1)(S^2-R_1^2)\}}]/(p_2^2+1) \quad (20)$$

($X_1=[-p_2S+\sqrt{\{(p_2S)^2-(p_6^2+1)(s^2-R_1^2)\}}]/(p_2^2+1)$ is unsuitable)

where $p_2=-\tan\alpha_m$, $q_2=R_1(\cos\alpha_m+\sin\alpha_m\cdot\tan\alpha_m)$, and $s=p_2X_2+q_2-Y_s$ From equation (16), the Y-coordinate thereof is obtained as follows:

$$Y_1=\sqrt{(R_1^2-X_1^2)}$$

($Y_1=-\sqrt{(R_1^2-X_1^2)}$ is unsuitable)

The coordinates of the axis of the step link roller 6*b* of the step 2 on the lower step side are ($X_1+X_s$, $Y_1+Y_s$).

Note that this relationship is applicable in the region between the state in which the axis of the lower-step-side step link roller 6*b* is positioned at the border point 30 between the upper curved section B and the intermediate inclined section C and the state in which the axis of the upper-step-side step link roller 6*a* is positioned at the border point 30 between the upper curved section B and the intermediate inclined section C (the state in which the axis of the upper-step-side step link roller shaft 5 is in the upper curved section B and in which the axis of the lower-step-side step link roller shaft 5 is situated in the intermediate inclined section C). The state in which the axis of the lower-step-side step link roller 6*b* is positioned at the border point 30 corresponds to the intermediate-inclined section-C-side limit point of the upper curved section to which equation (16) is applicable. The state in which the axis of the upper-step-side step link roller 6*a* is positioned at the border point 30 correspondsto the upper-curved section-B-side limit point of the intermediate inclined section C to which equation (17) is applicable.

The coordinates of the border point 30 between the upper curved section B and the intermediate inclined section C are ($R_1$sin $\alpha_m$, $R_1$cos $\alpha_m$), so that when the axis of the upper-step-side step link roller 6*a* is positioned at the border point 30, the following equations hold true:

$$X_1=R_1\sin\alpha_m \quad (21)$$

$$Y_1=R_1\cos\alpha_m \quad (22)$$

Equations (21) and (22) are substituted into equation (17). $(R_1\cos\alpha_m+Y_S)=p_2(R_1\sin\alpha_m+X_S)+q_2$ $$P_2=-\tan\alpha_m,\ q_2=R_1(\cos\alpha_m+\sin\alpha_m\cdot\tan\alpha_m)$$

Thus, $$(R_1\cos\alpha_m+Y_S)=-\tan\alpha_m(R_1\sin\alpha_m+X_S)+R_1(\cos\alpha_m+\sin\alpha_m\cdot\tan\alpha_m)$$

$$Y_S=X_S\cdot\tan\alpha_m$$

The value of $Y_s$ when the axis of the lower-step-side step link roller **6*b* is positioned at the border point 30 between the upper curved section B and the intermediate inclined section C has already been obtained from equation (15), so that the equation is adopted; equation (20) is applied when the relative position $Y_s$ in the y-direction of the axis of the step link roller 6*b* of the lower-step-side step 2 with respect to the axis of the step link roller 6*a* of the upper-step-side step 2** is in the following range:

$$-X_S\cdot\tan\alpha_m\leqq Y_S$$

$$<R_1\cos\alpha_m-\sqrt{\{(R_1\cos\alpha_m)^2+(2R_1\sin\alpha_m\cdot X_S-X_S^2)\}}$$

Figure 6:
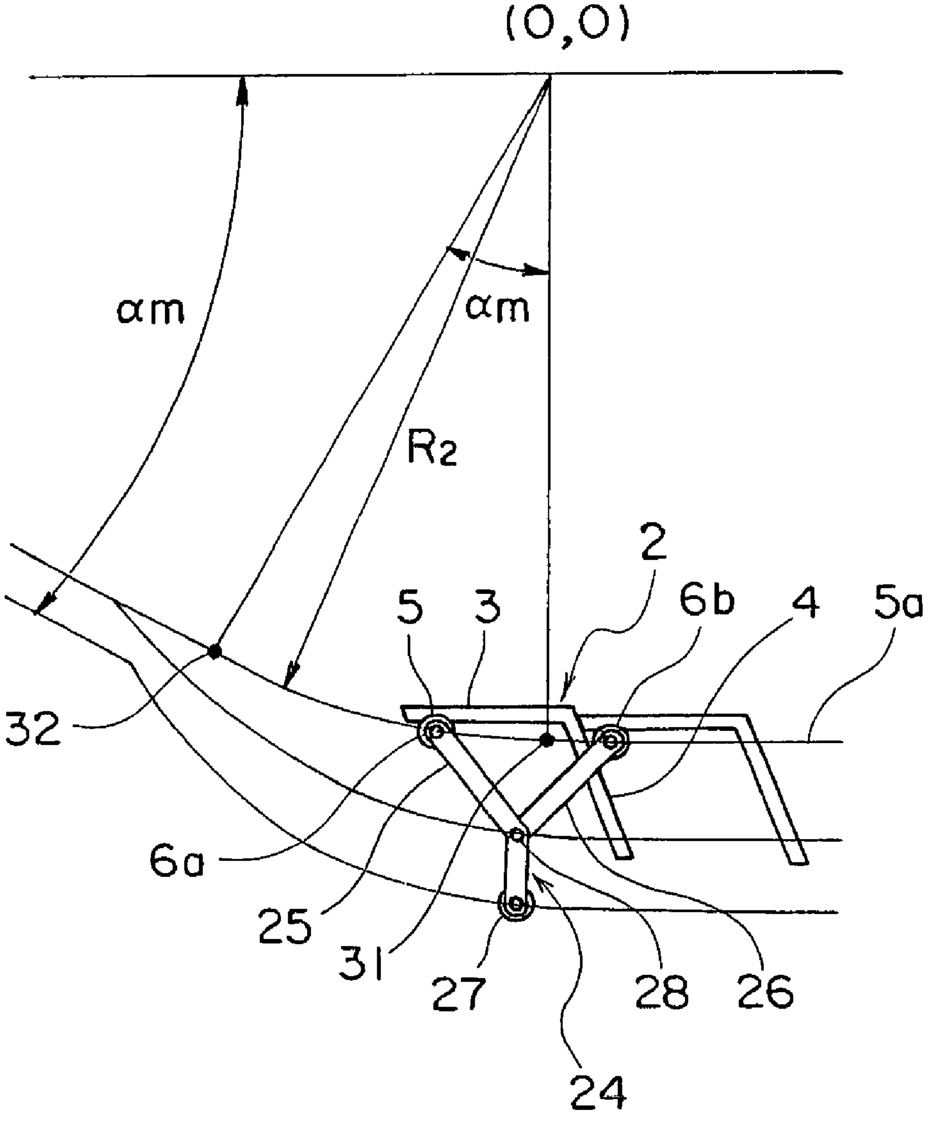
FIG. 6 is an explanatory diagram showing the movement locus of the axis of the step link roller shaft near a lower landing section and a lower curved section of FIG. 1.

FIG. 6 is an explanatory diagram showing the movement locus of the axis of the step link roller shaft 5 near the lower landing section E and the lower curved section D of FIG. 1. In the drawing, the radius of curvature of the movement locus **5*a* of the axis of the step link roller shaft 5 in the lower curved section D is $R_2$. The origin of the coordinate system is a point vertically (in the y-direction) spaced apart by $R_2$ from the border point 31 which is in the movement locus 5*a* of the axis of the step link roller shaft 5** and which is between the lower landing section E and the lower curved section D.

Here, the axis of the step link roller **6*a* of the step 2 on the upper step side is supposedly positioned in the lower curved section D, and its coordinates are $(X_1, X_2)$. The axis of the step link roller 6*b* of the step 2 on the lower step side is supposedly positioned in the lower landing section E, and its coordinates are $(X_2, X_2)$. Further, the relative position of the axis of the step link roller 6*b* of the step 2 on the lower step side with respect to the axis of the step link roller 6*a* of the step 2** on the upper step side is supposedly $(X_s, Y_s)$.

The movement locus of the axis of the step link roller **6*a*** in the lower curved section D at this time is expressed as follows:

$$y^2=R_2^2-X^2$$

Thus, the coordinates of the axis of the step link roller shaft 5 on the upper step side are in the following relationship:

$$Y_1^2=R_2^2-X_1^2 \quad (23)$$

Further, in the lower landing section E, the following relationship holds true:

$$y=-R_2$$

The coordinates of the axis of the step link roller **6*b* of the step 2** on the lower side are as follows:

$$(Y_1+Y_S)=-R_2 \quad (24)$$

$$Y_1=-R_2-Y_S \quad (24)'$$

Here, the $(X_1, Y_1)$ satisfying both equations (23) and (24) are the coordinates of the upper-step-side step link roller **6*a* when the relative position of the axis of the step link roller 6*b* of the lower-step-side step 2 with respect to the axis of the step link roller 6*a* of the upper-step-side step 2** is $(X_s, Y_s)$ Thus, from the simultaneous equations of (23) and (24), $X_1$ is obtained.

By substituting equation (24)' into equation (23) for modification, the following equation (25) is obtained:

$$X_1^2=2R_2Y_S-Y_S^2 \quad (25)$$

Thus, $$X_1=-\sqrt{(2R_2\cdot Y_S-Y_S^2)} \quad (26)$$

$(X_1=+\sqrt{(2R_2\cdot Y_S-Y_S^2)}$ is unsuitable)

From equation (23), the Y-coordinate is obtained as follows:

$$Y_1=-\sqrt{(R_2^2-X_1^2)}$$

$(Y_1=\sqrt{(R_2^2-X_1^2)}$ is unsuitable)

Thus, the coordinates of the axis of the step link roller **6*b* of the step 2 on the lower step side are $(X_1+X_s, Y_1+Y_s)$ Note that this relationship is applicable in the region between the state in which the axis of the upper-step-side step link roller 6*a* is positioned at the border point 31 between the lower landing section E and the lower curved section D and the state in which the axis of the lower-step-side step link roller 6*b* is positioned at the border point 31 (the state in which the axis of the upper-step-side step link roller shaft 5 is in the lower curved section D and in which the axis of the lower-step-side step link roller shaft 5 is situated in the lower landing section E). The state in which the axis of the upper-step-side step link roller 6*a* is positioned at the border point 31 corresponds to the lower-curved section-D-side limit point of the lower landing section E to which equation (23) is applicable. The state in which the axis of the lower-step-side step link roller 6*b* is positioned at the border point 31** corresponds to the lower-landing section-E-side limit point of the lower curved section D to which equation (24) is applicable.

When the axis of the upper-step-side step link roller **6*a* is positioned at the border point 31** between the lower landing section E and the lower curved section D, $Y_1=-R$, so that this is substituted into equation (24) to obtain $Y_S$ as follows:

$$Y_S=0 \quad (27)$$

When the axis of the step link roller **6*b* on the lower step side is at the border point 31** between the lower landing section E and the lower curved section D, the following equations hold true:

$$X_1+Y_S=0,\text{ and thus } X_1=-X_S \quad (28)$$

$$Y_1+Y_S=-R_2,\ Y_1=-(R_2+Y_S) \quad (29)$$

By substituting equations (28) and (29) into equation (23), the following equations are obtained:

$$(R_2+Y_S)^2=R_2^2-X_S^2$$

$$Y_S^2+2R_2\cdot Y_s-X_S^2=0 \quad (30)$$

By solving equation (30) with respect to Y, by the quadratic equation formula, the following equation is obtained:

$$Y_S=-R_2+\sqrt{(R_2^2-X_S^2)} \quad (31)$$

$(Y_S=R_2-\sqrt{(R_2^2-X_S^2)}$ is unsuitable)

Thus, equation (26) is applicable when the relative position $Y_s$ in the y-direction of the axis of the step link roller 6*b* of the step 2 on the lower step side with respect to the axis of the step link roller 6*a* of the step 2 on the upper step side is in the following range between equations (27) and (31):

$$-R_2+\sqrt{(R_2^2-X_S^2)}\leq Y_S<0$$

Figure 7:
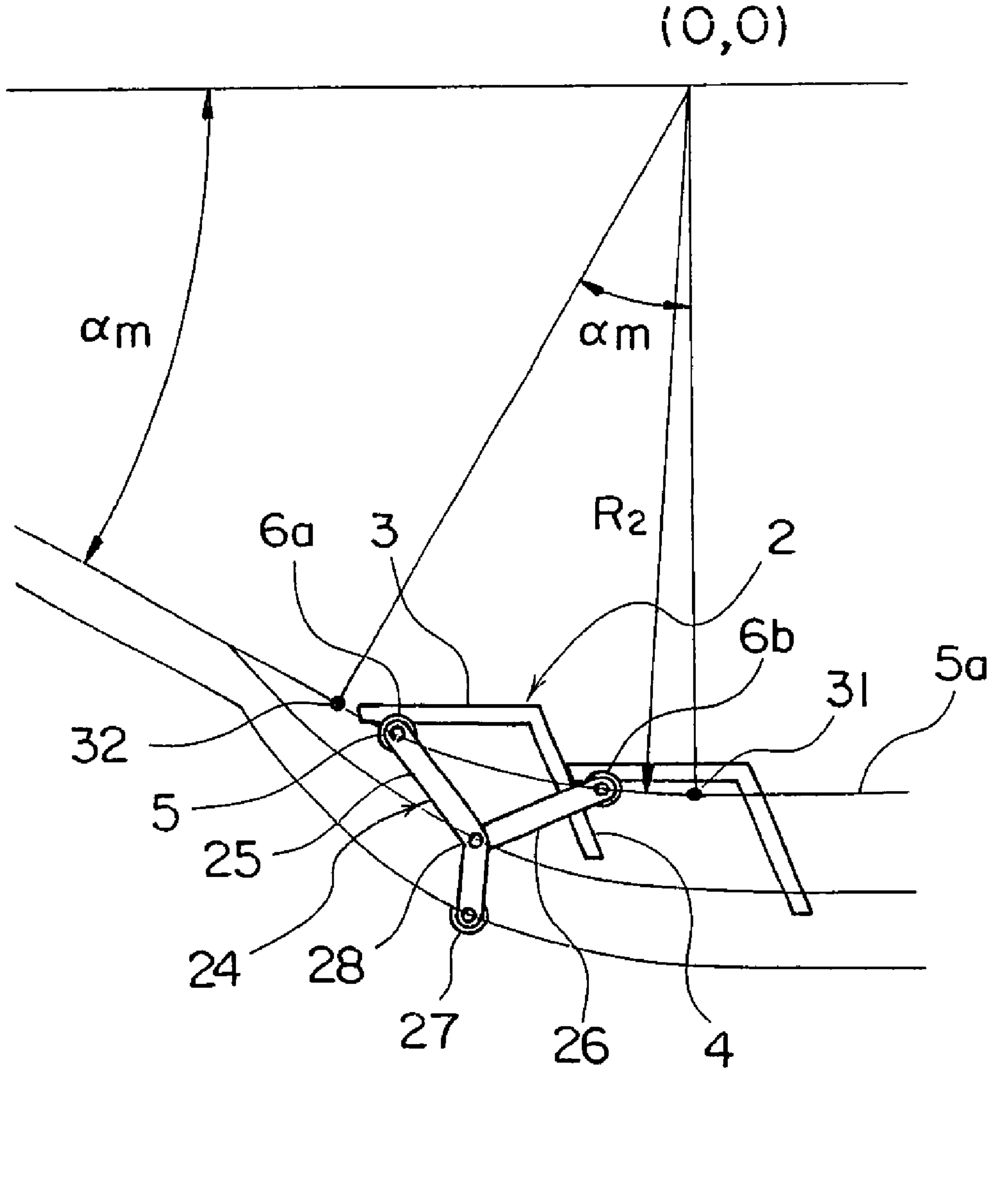
FIG. 7 is an explanatory diagram showing the movement locus of the axis of the step link roller shaft in a section nearer to the intermediate inclined section than in FIG. 6.

FIG. 7 is an explanatory diagram showing the movement locus of the axis of the step link roller shaft 5 in a section nearer to the intermediate inclined section C than in FIG. 6. In the drawing, suppose the axis of the step link roller 6*a* of the step 2 on the upper step side and that the axis of the step link roller 6*b* of the step 2 on the lower step side are both in the lower curved section D, their respective coordinates being $(X_1, X_2)$ and $(X_2, X_2)$. Further, suppose the relative position of the axis of the step link roller 6*b* of the step 2 on the lower step side with respect to the axis of the step link roller 6*a* of the step 2 on the upper step side is $(X_s, Y_s)$.

The movement locus of the axes of the step link rollers 6*a* and 6*b* in the lower curved section D at this time can be expressed as follows:

$$y_2=R_2^2-X^2$$

Thus, the coordinates of the axis of the step link roller 6*a* of the upper step side are in the following relationship:

$$Y_1^2=R_2^2-X_1^2 \quad (32)$$

$$Y_1=-\sqrt{(R_2^2X_1^2)}$$

$$(Y_1=\sqrt{(R_2^2-X_1^2)}) \quad (32)'$$

The coordinates of the axis of the step link roller 6*b* of the lower step side are in the following relationship:

$$(Y_1+Y_s)^2=R_2^2(X_1+X_s)^2 \quad (33)$$

Here, the $(X_1, Y_1)$ satisfying both equations (32) and (33) are the coordinates of the axis of the upper-step-side step link roller 6*a* when the relative position of the axis of the step link roller 6*b* of the lower-step-side step with respect to the axis of the step link roller 6*a* of the upper-step-side step is $(X_s, Y_s)$. Thus, from the simultaneous equations of (32) and (33), $X_1$ is obtained.

First, equation (33) is expanded.

$$Y_1^2+2Y_s\cdot Y_1+Y_S^2=R_2^2-X_1^2-2X_s\cdot X_1-X_S^2 \quad (33)'$$

Next, equation (32)' is substituted into equation (33)'.

$$Y_1^2-2Y_s\sqrt{(R_2^2-X_1^2)}+Y_S^2=Y_1^2-2X_s\cdot X_1-X_S^2$$

$$-2Y_s\sqrt{(R_2^2-X_1^2)}=-2X_s\cdot X_1\cdot(X_s^2+Y_s)$$

$$\sqrt{(R_2^2-X_1^2)}=(X_S/X_S)X_1+(X_s^2+Y_s^2)/2Y_S$$

Here, it is supposed that $p_3=X_S/Y_S$, and $q_1=(X_s^2+Y_S^2)/2Y_S$, thereby obtaining following equation:

$$\sqrt{(R_2^2-X_1^2)}=p_1X_1+q_1$$

By squaring both sides for modification, the following equation is obtained:

$$(p_1^2+1)X_1^2+2p_1q_1\cdot X_1+(q_1^2-R_2^2)=0 \quad (34)$$

Equation (10) is solved with respect to $X_1$ by the quadratic equation formula.

$$X_1=[-p_3q_3-\sqrt{\{(p_3q_3)^2-(p_3^2+1)(q_3^2-R_2^2)\}}]/(p_3^2+1) \quad (35)$$

$(X=[-p_3q_3+\sqrt{\{(p_3q_3)^2-(p_3^2+1)(q_3^2-R_2^2)\}}]/(p_3^2+1)$ is unsuitable)

where $p_3=X_S/Y_S$, $q_3=(X_S^2+Y_S^2)/2Y_S$

From equation (32)', the Y-coordinate thereof is obtained as follows:

$$Y_1=-\sqrt{(R_2^2X_{12})}$$

$$(Y_1=\sqrt{(R_2^2-X_1^2)})$$

The coordinates of the axis of the step link roller 6*b* of the step on the lower step side are $(X_1+X_S, Y_1+Y_s)$ Note that this relationship is applicable in the region between the state in which the axis of the lower-step-side step link roller 6*b* is positioned at the border point 31 between the lower landing section E and the lower curved section D and the state in which the axis of the upper-step-side step link roller 6*a* is positioned at the border point 32 between the lower curved section D and the intermediate inclined section C (the state in which the axis of the upper-step-side step link roller shaft 5 and the axis of the lower-step-side step link roller shaft 5 are both in the lower curved section D). The state in which the axis of the lower-step-side step link roller 6*b* is positioned at the border point 31 corresponds to the lower-landing section-E-side limit point of the lower curved section D to which equation (32) is applicable. The state in which the axis of the upper-step-side step link roller 6*a* is positioned at the border point 32 corresponds to the intermediate-inclined section-C-side limit point of the lower curved section D to which equation (33) is applicable.

The coordinates of the border point 32 between the lower curved section D and the intermediate inclined section C are $(-R_2\sin\alpha_m, R_2\cos\alpha_m)$, so that when the axis of the upper-step-side step link roller 6*a* is positioned at the border point 32, the following equations hold true:

$$X_1=-R_2\sin\alpha_m \quad (36)$$

$$Y_1=-R_2\cos\alpha_m \quad (37)$$

Equations (36) and (37) are substituted into equation (32) for modification as follows:

$$(-R_2\cos\alpha_m+Y_S)^2=R_2^2-(-R_2\sin\alpha_m+X_S)^2$$

$$R_2^2\cos^2\alpha_m-2R_2\cos\alpha_m\cdot Y_S+Y_S^2=R_2^2-R_2^2\sin^2\alpha_m+2R_2\sin\alpha_m\cdot X_S-X_S^2$$

$$Y_S^2-2R_2\cos\alpha_mY_S-(2R_2\sin\alpha_m\cdot X_S31\ X_S^2)=0 \quad (38)$$

Equation (38) is solved with respect to $Y_s$ by the quadratic equation formula to obtain the $Y_s$ when the axis of the upper-step-side step link roller 6*a* is positioned at the border point 32 between the lower curved section D an d the intermediate inclined section C as follows:

$$Y_S=R_2\cos\alpha_m-\sqrt{\{(R_2\cos\alpha_m)^2+(2R_2\sin\alpha_m\cdot X_SX_S^2)\}} \quad (39)$$

$(Y_S=R_2\cos\alpha_m+\sqrt{\{(R_2\cos\alpha_m)^2+(2R_2\sin\alpha_m\cdot X_S-X_S^2)\}}$ is unsuitable)

The value of $Y_s$ when the axis of the lower-step-side step link roller 6*b* is positioned at the border point 31 between the lower landing section E and the lower curved section D has already been obtained from equation (31), so that the equation is adopted; equation (35) is applied when the relative position $Y_s$ in the y-direction of the axis of the lower-step-side step step link roller 6*b* with respect to the axis of the step link roller 6*a* of the upper-step-side step is in the following range:

$$R_2\cos\alpha_m-\sqrt{\{(R_2\cos\alpha_m)^2+(2R_2\sin\alpha_m\cdot X_S-X_S^2)\}}\leqq Y_S<-R_2+\sqrt{(R_2^2-X_S^2)}$$

Figure 8:
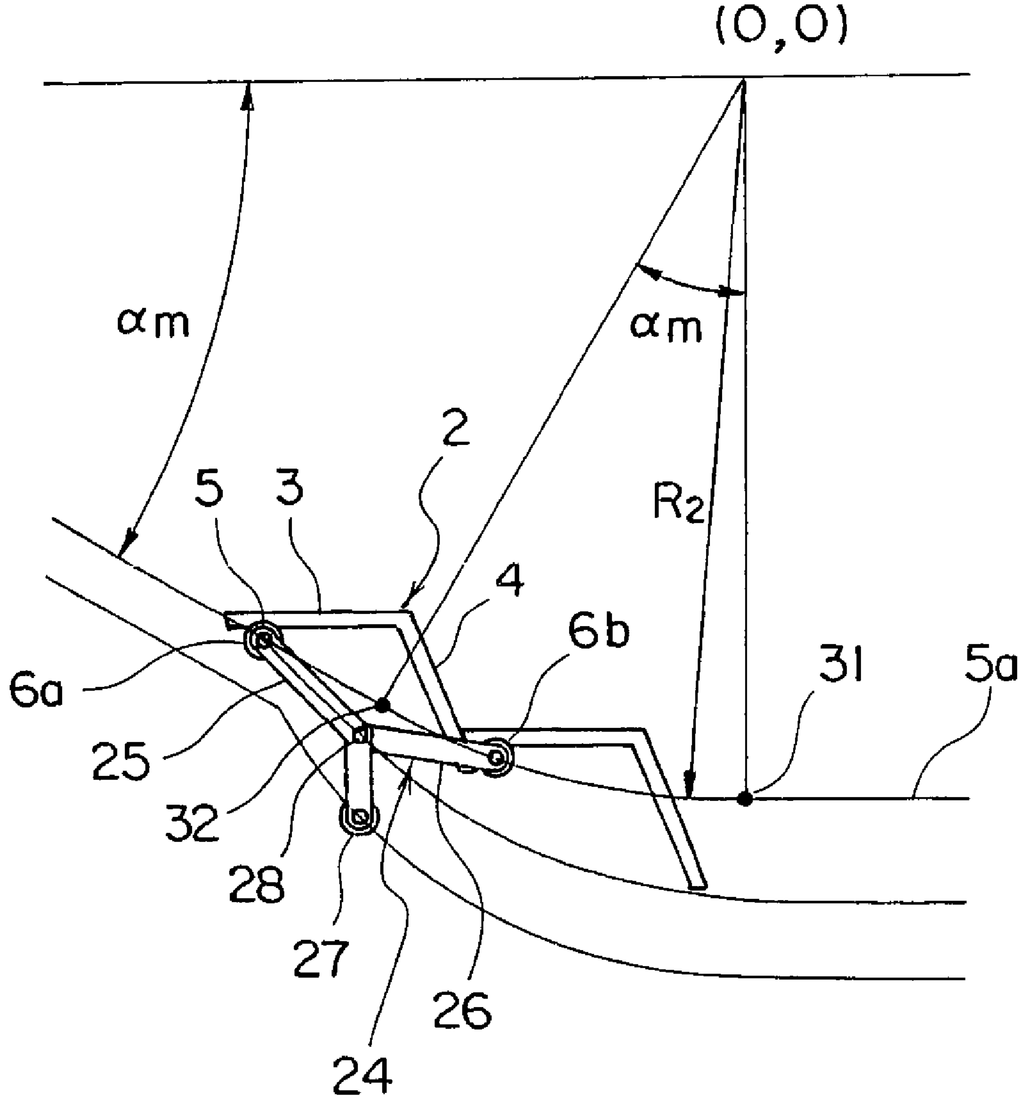
FIG. 8 is an explanatory diagram showing the movement locus of the axis of the step link roller shaft in a section nearer to the intermediate inclined section than in FIG. 7.

FIG. 8 is an explanatory diagram showing the movement locus of the axis of the step link roller shaft 5 in a section nearer to the intermediate inclined section C than in FIG. 7. In the drawing, the axis of the step link roller 6*a* of the step 23 on the upper step side is positioned in the intermediate inclined section C, and its coordinates are ($X_1$, $X_2$). Further, the axis of the step link roller 6*b* of the step 2 on the lower step side is positioned in the lower curved section D, and its coordinates are ($X_2$, $X_2$). Further, the relative position of the axis of the step link roller 6*b* of the step 2 on the lower step side with respect to the axis of the step link roller 6*a* of the step 2 on the upper step side is ($X_s$, $Y_s$).

The straight line of the movement locus of the axis of the step link roller shaft in the intermediate inclined section C is expressed as follows:

$$y=p_4x+q_4$$

Thus, the coordinates of the axis of the upper-step-side step link roller 6*a* positioned in the intermediate inclined section C can be expressed as follows:

$$Y_1=p_4X_1+q_4 \tag{40}$$

This straight line passes the coordinates ($-R_2\sin\alpha_m$, $-R_2\cos\alpha_m$) of the border point 32 between the lower curved section D and the intermediate inclined section C and has an incline $p_4$. Here, $p_4=-\tan\alpha_m$, $q_2-R_2(\cos\alpha_m-\sin\alpha_m\cdot\tan\alpha_m)$.

Further, the movement locus of the axis of the lower-step-side step link roller 6*b* in the lower curved section D can be expressed as follows:

$$y^2=R_2^2-X^2$$

Thus, the coordinates of the axis of the step link roller 6*b* on the lower step side are in the following relationship:

$$(Y_1+Y_S)^2=R_2^2-(X_1+X_S)^2 \tag{41}$$

By expanding equation (41) and substituting equation (40) into it for modification, the following equation is obtained:

$$(p_4^2+1)X_1^2+2(p_4q_4+p_4Y_S+X_S)X_1+\{(q_4+Y_S)^2-R_2^2+X_S^2\}=0 \tag{42}$$

Equation (42) is solved with respect to $X_1$ by using the quadratic equation formula.

$$X_1=\{-(p_4q_4+p_4Y_S+X_S)+\sqrt{A_1}\}/(p_4^2+1) \tag{43}$$

$$A_1=(p_4q_4+p_4Y_S+X_S)^2-(p_4^2+1)\{(q_4+Y_S)^2-R_2^2+X_S^2\}$$

$$(X_1=\{-(p_4q_4+p_4Y_S+X_S)-\sqrt{A_1}\}/(p_4^2+1)\text{ is unsuitable})$$

where $p_4=-\tan\alpha_m$, $q_2=-R_2(\cos\alpha_m+\sin\alpha_m\cdot\tan\alpha_m)$ From equation (40), the Y-coordinate at that time is expressed as follows:

$$Y_1=p_4X_1+q_4$$

The coordinates of the axis of the step link roller 6*b* of the step on the lower step side are ($X_1+X_S$, $Y_1+Y_S$).

Note that this relationship is applicable in the region between the state when the axis of the upper-step-side step link roller 6*a* is positioned at the border point 32 between the lower curved section D and the intermediate inclined section C and the state when the axis of the lower-step-side step link roller 6*b* is positioned at the border point 32 (the state in which the axis of the upper-step-side step link roller shaft 5 is positioned in the intermediate inclined section C and in which the axis of the lower-step-side step link roller shaft 5 is situated in the lower curved section D). The state in which the axis of the upper-step-side step link roller 6*a* is positioned at the border point 32 corresponds to the lower-curved section-D-side limit point of the intermediate inclined section C to which equation (40) is applicable. The state in which the axis of the lower-step-side step link roller 6*b* is positioned at the border point 32 corresponds to the intermediate-inclined section-C-side limit point of the lower curved section D to which equation (41) is applicable.

The coordinates of the border point 32 between the lower curved section D and the intermediate inclined section C are ($-R_2\sin\alpha_m$, $-R_2\cos\alpha_m$), so that when the axis of the lower-step-side step link roller 6*a* is positioned at the border point 32, the following equations hold true:

$$X_1+X_S=-R_2\sin\alpha_m X_1=-R_2\sin\alpha_m-X_S \tag{44}$$

$$Y_1+Y_S=-R_2\cos\alpha_m Y_1=-R_2\cos\alpha_m-Y_S \tag{45}$$

By substituting equations (44) and (45) into equation (40) for modification, the following equation is obtained:

$$-R_2\cos\alpha_m-Y_S=p_4(-R_2\sin\alpha_m-X_S)q_4 \tag{46}$$

Since $p_4=-\tan\alpha_m$, $q_2=-R_2(\cos\alpha_m+\sin\alpha_m\cdot\tan\alpha_m)$, $$-R_2\cos\alpha_m-Y_S=R_2\sin\alpha_m\cdot\tan\alpha_m+X_S\tan\alpha_m-R_2\cos\alpha_m-R_2\sin\alpha_m\tan\alpha_m$$

$$Y_S=-X_S\tan\alpha_m$$

The value of $Y_s$ when the axis of the lower-step-side step link roller 6*b* is positioned at the border point 32 between the lower curved section D and the intermediate inclined section C has already been obtained from equation (39), so that the equation is adopted; equation (43) is applied when the relative position $Y_s$ in the y-direction of the axis of the step link roller 6*b* of the step 2 on the lower step side with respect to the axis of the step link roller 6*a* of the step 2 on the upper step side is in the following range:

$$-X_S\tan\alpha_m\leqq Y_S<R_2\cos\alpha_m-\sqrt{\{(R_2\cos\alpha_m)^2+(2R_2\sin\alpha_m\cdot X_SX_S^2)\}}$$

By the above-described method, in the upper curved section B and the lower curved section D where the step 2 undergoes a change in difference in level, it is possible to obtain the coordinates of the axis of the step link roller 6*a* on the upper step side and the coordinates of the axis of the step link roller 6*b* on the lower step side.

Figure 9:
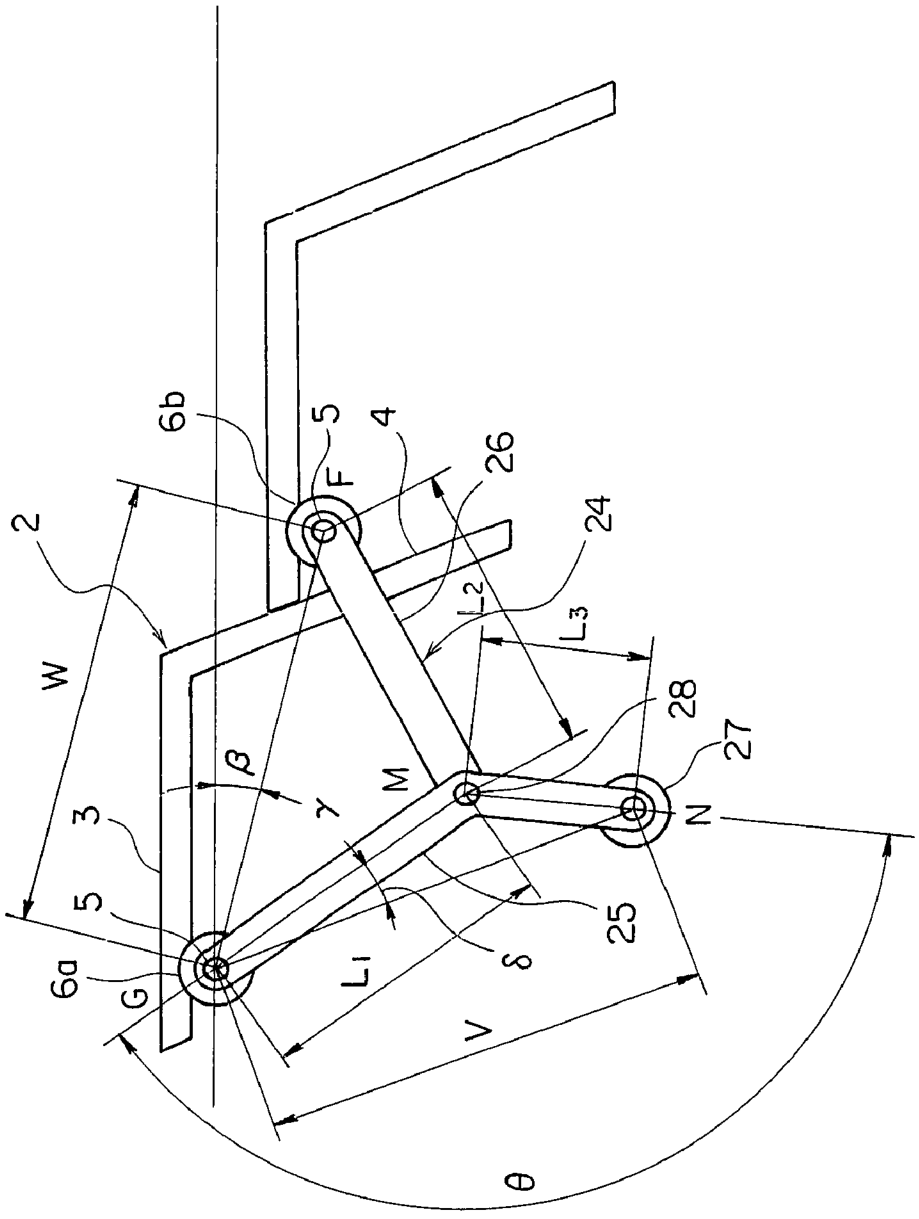
FIG. 9 is an explanatory diagram showing the relationship between a position of the axis of the step link roller shaft, a position of a link connection point, and a position of the axis of an auxiliary roller in the escalator with a high speed inclined section of FIG. 1.

Next, FIG. 9 is an explanatory diagram showing the relationship between the position of the axis of the step link roller shaft, the position of the link connection point, and the position of the axis of the auxiliary roller in the escalator with a high speed inclined section of FIG. 1. Here,, the procedures for obtaining the position of the link connection point M (shaft 28) from the positions of the axes G and F of the adjacent step link roller shafts 5 obtained by the above procedures will be described.

Assuming that the coordinates of the axis G of the step link roller shaft 5 (step link roller 6*a*) on the upper step side are ($X_G$, $Y_G$), and that the coordinates of the step link roller shaft 5 (step link roller 6*b*) on the lower step side are ($X_F$, $Y_F$), the distance W between the axes can be expressed as follows:

$$W=\sqrt{\{(X_G-X_F)^2+(Y_G-Y_F)^2\}}$$

Further, the angle β made by segment FG connecting the two axes and a horizontal line can be expressed as follows:

$$\beta=\tan^{-1}\{(Y_F-Y_G)/(X_F-X_G)\}$$

Here, assuming that the length of segment GM connecting the axis G of the step link roller shaft 5 on the upper step side and the link connection point M is $L_1$, and that the length of segment FM connecting the axis F of the step link roller shaft 5 on the lower step side and the link connection point M is $L_2$, the angle $\gamma$ made by segments GF and GM is expressed as follows:

$$\gamma=\cos^{-1}\{(L_1^2-L_2^2+W^2)/2L_1W\} \text{ . . . second cosine theorem}$$

Since the angle made by segment FM and the horizontal line is $\beta-\gamma$, the coordinates of the link connection point M, $(X_M, Y_M)$, can be obtained as follows:

$$X_M=X_F+L_1 \cos\{\beta-\gamma\}$$

$$Y_M=Y_F+L_1 \sin\{\beta-\gamma\}$$

Thus, it is possible to obtain the relationship between the relative position of the axis of the step link roller shaft 5 and the position of the link connection point.

Further, by sequentially calculating the coordinates of the link connection point M, $(X_M, Y_M)$, along the movement locus of the relative coordinates of the axis of the step link roller shaft 5, it is possible to obtain the movement locus of the link connection point M. Further, from the movement locus of the link connection point M, it is also possible to obtain the movement locus of the axis N of the auxiliary roller 27. And, a configuration obtained be offsetting the obtained movement locus of the axis N of the auxiliary roller 27 by the radius of the auxiliary roller 27 may be the configuration of the auxiliary track 23.

Further, by substantially matching the configuration of the riser 4 with the movement locus of the axis of the adjacent roller shaft 5, it is possible to prevent interference of the tread 3 with the riser 4 of the adjacent step 2 and generation of a gap between the riser 4 and the tread 3 during the process of changing the difference in level of the adjacent steps 2. That is, it is also possible to separately set the locus of the step link roller shaft 5 and the locus of the link connection point; in that case, however, interference and gap generation occur. In contrast, by establishing the above relationship between the locus of the step link roller shaft 5 and the locus of the link connection point, it is possible to prevent interference and gap generation.

Next, the method of setting the position of the axis of the auxiliary roller 27 will be described. In FIG. 9, suppose the coordinates of the axis N of the auxiliary roller 27 are $(X_N, Y_N)$. Further, suppose the length of segment MN from the axis N to the link connection point M is $L_3$. Further, suppose the angle made by segment MN and segment GM of a length $L_1$ is $\theta$. Here, the length V of segment GN connecting the coordinates of the axis G of the step link roller shaft 5 on the upper step side and the axis N of the auxiliary roller 27 is obtained as follows:

$$V_2^2=L_1^2+L_3^2-2L_1L_3 \cos\theta \text{ . . . second cosine theorem}$$

Thus, $$V=\sqrt{(L_1^2+L_3^2-2L_1L_3 \cos\theta)}$$

The angle $\theta$ is in the following relationship:

$$V/\sin\theta=L_3 \sin\delta \text{ . . . sine theorem}$$

Thus, $$\delta=\sin^{-1}(L_3 \sin\theta/V)$$

Here, the angle of segment GN with respect to the horizontal line is $\beta-\gamma-\delta$. Thus, the coordinates of the axis N of the auxiliary roller 27 are obtained as follows:

$$X_N=X_1+V \cos\{\beta-\gamma-\delta\}$$

$$Y_N=Y_1+L_1 \sin\{\beta-\gamma-\delta\}$$

By obtaining the coordinates $(X_N, Y_N)$ of the axis N through sequential calculation along the movement locus of the axis of the relative coordinates of the axis of the step link roller shaft 5, it is possible to obtain the movement locus of the axis N of the auxiliary roller 27. And, by offsetting the movement locus of the auxiliary roller 27 by the radius of the auxiliary roller 27, it is possible to obtain the configuration of the auxiliary track 23.

Embodiment 2

Figure 10:
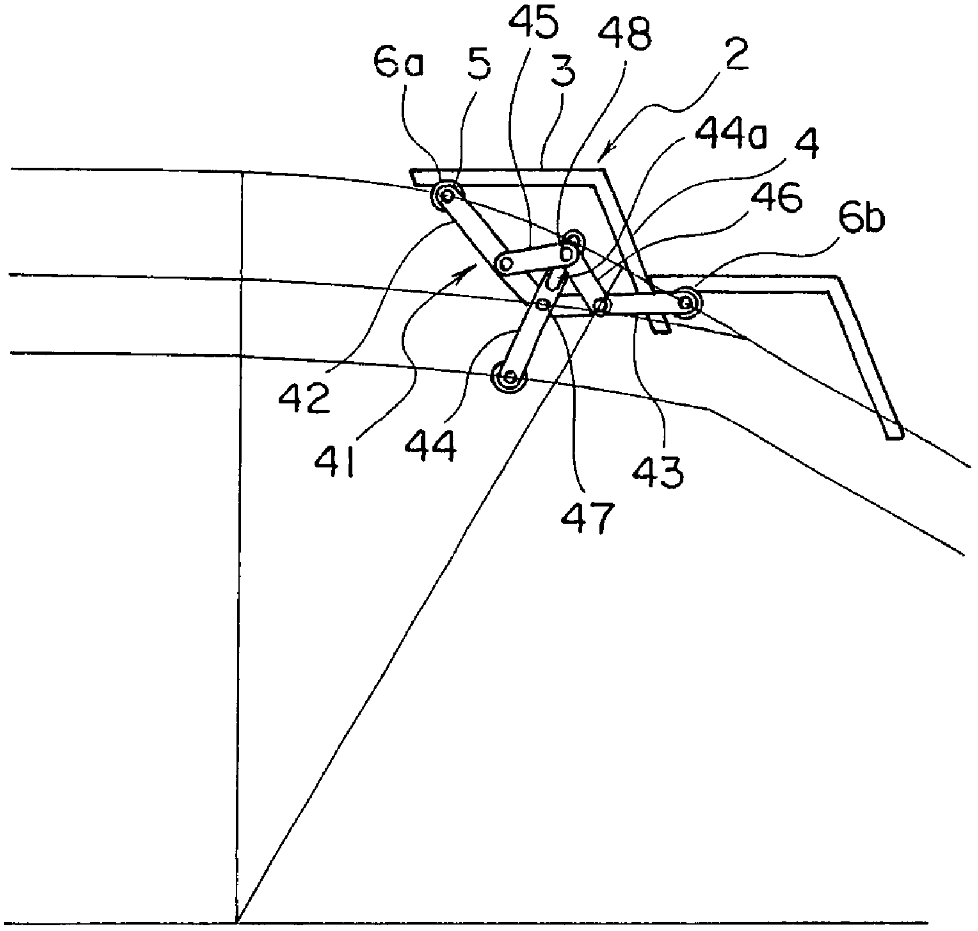
FIG. 10 is a side view showing a main portion of an escalator with a high speed inclined section according to Embodiment 2 of this invention.
Figure 11:
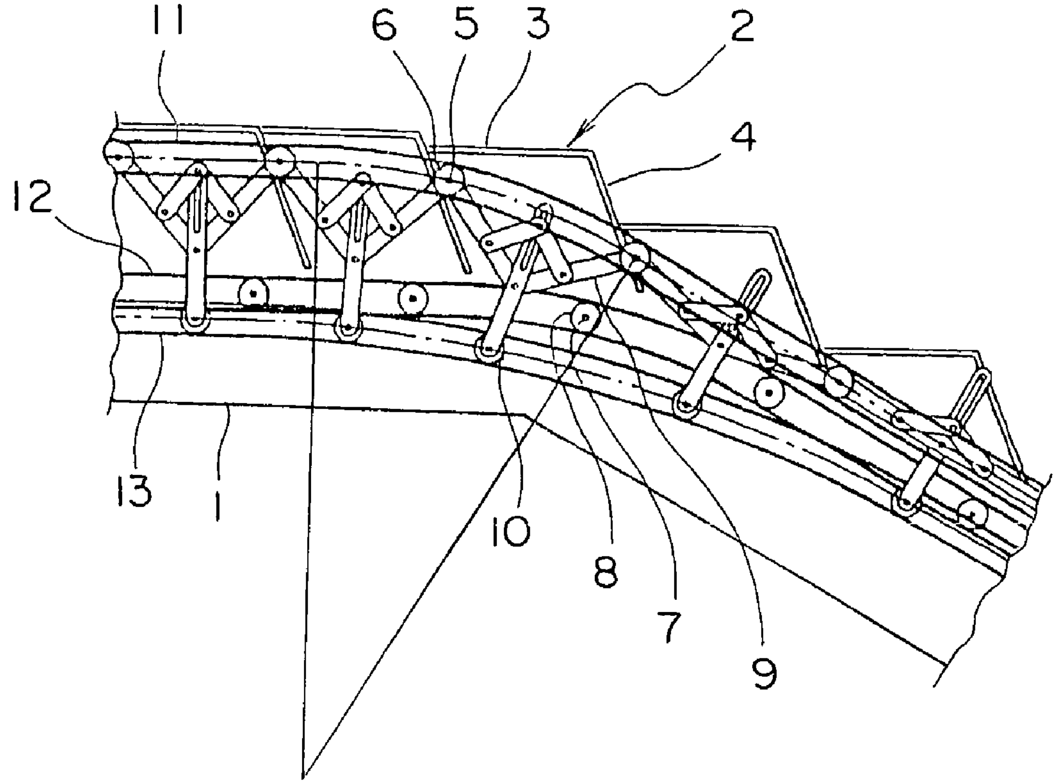
FIG. 11 is a side view of a main portion of an example of a conventional escalator with a high speed inclined section.

While in Embodiment 1 the link mechanism 24 having the first and second links 25 and 26 is used, it is also possible to use, for example, a link mechanism 41constituting a pantograph type quadruple link mechanism as shown in FIG. 10. In FIG. 10, the link mechanism 41 has first through fifth links 42 through 46.

One end portion of the first link 42 is rotatably connected to the step link roller shaft 5. The other end portion of the first link 42 is rotatably connected to the middle portion of the third link 44 through a shaft 47. One end portion of the second link 43 is rotatably connected to the step link roller shaft 5 of the adjacent step 2. The other end portion of the second link 43 is rotatably connected to the middle portion of the third link 44 through a shaft 47.

One end portion of the fourth link 45 is rotatably connected to the middle portion of the first link 42. To the middle portion of the second link 43, one end portion of the fifth link 46 is rotatably connected. The other end portions of the fourth and fifth links 45 and 46 are connected to one end portion of the third link 44 through a slide shaft 48.

In one end portion of the third link 44, there is provided a guide groove 44*a* for guiding the sliding of the slide shaft 48 in the longitudinal direction of:the third link 44. At the other end of the third link 44, there is provided a rotatable auxiliary roller 27.

As in Embodiment 1, also in the case in which this link mechanism 42 is used, the position of the link connection point (shaft 47) is obtained from the positional relationship of the axis of the upper-step-side step link roller 6*a* and the lower-step-side step link roller 6*b* to thereby obtain the movement locus of the link connection point. Further, from the movement locus of the link connection point, it is also possible to obtain the movement locus of the axis of the auxiliary roller 27. Further, by substantially matching the configuration of the riser 4 with the movement locus of the axis of the adjacent step link roller shaft 5, it is possible to prevent interference of the tread 3 with the riser 4 of the adjacent step 2 and generation of a gap between the riser 4 and the tread 3 during the process of changing difference in level between the adjacent steps 2.

While in Embodiments 1 and 2 the configuration of the riser 4 is substantially matched with the movement locus of the relative position of the axis of the adjacent step link roller shaft 5, it is also possible to first determine the configuration of the riser 4 and then determine the movement locus of the relative position of the axis of the adjacent step link roller shaft 5 so as to be in conformity with the configuration.

What is claimed is:

1. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each like mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in an upper speed changing section and a lower speed changing section, wherein, when axes of adjacent step link roller shafts are in the upper speed changing section, and, assuming that relative coordinates in horizontal and vertical directions of the axes of the step link roller shafts are $(X_s, Y_s)$, that radius of curvature of a movement locus of the axis of the step link roller shaft in the upper curved section is $R_1$, and that a point vertically spaced apart by $-R_1$ from a border point which is in the movement locus of the axis of the step link roller shaft and between the upper landing section and the upper curved section, is the origin of a coordinate system, when Ys is in the following range:

$$-R_1+\sqrt{(R_1^2-X_s^2)} \leqq Y_s < 0,$$

a relationship between relative positions of adjacent step link rollers in the upper speed changing section is expressed as:

$$X_1=-X_s+\sqrt{(-2R_1 \cdot Y_s-Y_s^2)},$$

$$Y_1=R_1,$$

$$X_2=X_1+X_S,$$

and $$Y_2=Y_1+Y_s,$$

where a horizontal coordinate of the axis of an upper-step-side step link roller shaft is $X_1$, a vertical coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$ and position of a link connection point is expressed by $$X_M=X_1+L_1 \cos\{\beta-\gamma\},$$

and $$Y_M=Y_1+L_1 \sin\{\beta-\gamma\}$$

where $\beta=\tan^{-1}\{(Y_1-Y_2)/(X_1-X_2)\}$, $\gamma=\cos^{-1}\{(L_1^2-L_2^2+W^2)/2L_1W\}$, $W=\sqrt{\{(X_1-X_2)^2+(Y_1-Y_2)^2\}}$, $X_M$ is horizontal coordinate of the link connection point, $Y_M$ is vertical coordinate of the link connection point, $L_1$ is distance from the axis of the upper-step-side step link roller shaft to the link connection point, and $L_2$ is distance from the axis of the lower-step-side step link roller shaft to the link connection point.

2. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each link mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in an upper speed changing section and a lower speed changing section, wherein, when axes of adjacent step link roller shafts are in the upper speed changing section, and, assuming that relative coordinates in horizontal and vertical directions of the axes of the step link roller shafts are $(X_s, Y_s)$, that radius of curvature of a movement locus of the axis of the step link roller shaft in the upper curved section is $R_1$, that an inclination angle of the intermediate inclined section is $\alpha_m$, and that a point vertically spaced apart by $-R_1$ from a border point, which is in the movement locus of the axis of the step link roller shaft and between the upper landing section and the upper curved section, is the origin of a coordinate system, when $Y_s$ is in the following range:

$$R_1 \cos\alpha_m-\sqrt{\{(R_1 \cos\alpha_m)^2+(2R_1 \sin\alpha_m \cdot X_s-X_s^2)\}} \leqq Y_S < -R_1+\sqrt{(R_1^2-X_s^2)},$$

a relationship between relative positions of adjacent step link rollers in the upper speed changing section is expressed as $$X_1=[-p_1q_1+\sqrt{\{(p_1q_1)^2-(p_1^2+1)(q_1^2-R_1^2)\}}]/(p_1^2+1),$$

$$Y_1=\sqrt{(R_1^2-X_1^2)},$$

$$X_2 = X_1 + X_s,$$

and $$Y_2 = Y_1 + Y_S$$

where, $p_1 = X_s/Y_s$, and $q_1 = (X_s^2 + Y_s^2)/2Y_s$, a horizontal coordinate of the axis of the upper-step-side step link roller shaft is $X_1$, a vertical coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$, and position of the link connection point is expressed by $$X_M = X_1 + L_1 \cos\{\beta - \gamma\},$$

and $$Y_M = Y_1 + L_1 \sin\{\beta - \gamma\}$$

where $\beta = \tan^{-1}\{(Y_1 - Y_2)/(X_1 - X_2)\}$, $\gamma = \cos^{-1}\{(L_1^2 - L_2^2 + W^2)/2L_1W\}$, $W = \sqrt{\{(X_1 - X_2)^2 + (Y_1 - Y_2)^2\}}$, $X_M$ is horizontal coordinate of the link connection point;

$Y_M$ is vertical coordinate of the link connection point;

$L_1$ is distance from the axis of the upper-step-side step link roller shaft to the link connection point, and $L_2$ is distance from the axis of the lower-step-side step link roller shaft to the link connection point.

3. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each like mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in a lower speed changing section and a lower speed changing section, wherein, when axes of adjacent step link roller shafts are in the upper speed changing section, and, assuming that relative coordinates in horizontal and vertical directions of the axes of the step link roller shafts are $(X_s, Y_s)$, that radius of curvature of a movement locus of the axis of the step link roller shaft in the upper curved section is $R_1$, that an inclination angle of the intermediate inclined section is $\alpha_m$, and that a point vertically spaced apart by $-R_1$ from a border point, which is in the movement locus of the axis of the step link roller shaft and between the upper landing section and the upper curved section, is the origin of a coordinate system, when $Y_s$ is in the following range:

$$-X_s \tan \alpha_m \leqq Y_s < R_1 \cos \alpha_m - \sqrt{\{(R_1 \cos \alpha_m)^2 + \{2R_1 \sin \alpha_m \cdot X_s - X_s^2)\}}$$

a relationship between relative positions of adjacent step link rollers in the upper speed changing section can be expressed by the following equations:

$$X_1 = [-p_2 s - \sqrt{\{(p_2 s)_2 - (p_2^2 + 1)(s^2 - R^2)\}}]/(p_2^2 + 1),$$

$$Y_1 = \sqrt{(R_1^2 - X_1^2)},$$

$$X_2 = X_1 + X_S,$$

and $$Y_2 = Y_1 + Y_s$$

where, $p_2 = -\tan \alpha_m$, $q_2 = R_1(\cos \alpha_m + \sin \alpha_m \cdot \tan \alpha_m)$, and $s = p_2 X_s + q_2 - Y_s$), a horizontal coordinate of the axis of the upper-step-side step link roller shaft is $X_1$, a vertical coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$, and position of the link connection point is expressed by:

$$X_M = X_1 + L_1 \cos\{\beta - \gamma\},$$

and $$Y_M = Y_1 + L_1 \sin\{\beta - \gamma\}$$

where $\beta = \tan^{-1}\{(Y_1 - Y_2)/(X_1 - X_2)\}$, $\gamma = \cos^{-1}\{(L_1^2 - L_2^2 + W^2)/2L_1W\}$, $W = \sqrt{\{(X_1 - X_2)^2 + (Y_1 - Y_2)^2\}}$, $X_M$ is horizontal coordinate of the link connection point, $Y_M$ is vertical coordinate of the link connection point, $L_1$ is distance from the axis of the upper-step-side step link roller shaft to the link connection point, and $L_2$ is distance from the axis of the lower-step-side step link roller shaft to the link connection point.

4. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each like mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in an upper speed changing section and a lower speed changing section, wherein, when axes of adjacent step link roller shafts are in the lower speed changing section, and, assuming that relative coordinates in horizontal and vertical directions of the axes of the step link roller shafts are $(X_s, Y_s)$, that radius of curvature of a movement locus of the axis of the step link roller shaft in the lower curved section is $R_2$, and that a point vertically spaced apart by $R_2$ from a border point which is in the movement locus of the axis of the step link roller shaft and between the lower landing section and the lower curved section, is the origin of a coordinate system, when Ys is in the following range $$-R_2+\sqrt{(R_2^2-X_s^2)} \leqq Y_s<0,$$

a relationship between relative positions of adjacent step link rollers in the lower speed changing section is expressed as:

$$X_1=-X_s+\sqrt{(-2R_2 \cdot Y_s-Y_s^2)},$$

$$Y_1=-\sqrt{(R_2^2-X_1^2)},$$

$$X_2=X_1+X_S,$$

and where a horizontal coordinate of the axis of an upper-step-side step link roller shaft is $X_1$, a vertical coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$ and position of a link connection point is expressed by $$X_M=X_1+L_1 \cos\{\beta-\gamma\},$$

and $$Y_M=Y_1+L_1 \sin\{\beta-\gamma\}$$

where $\beta=\tan^{-1}\{(Y_1-Y_2)/(X_1-X_2)\}$, $\gamma=\cos^{-1}\{(L_1^2-L_2^2+W^2)/2L_1W\}$, $W=\sqrt{\{(X_1-X_2)^2+(Y_1-Y_2)^2\}}$, $X_M$ is horizontal coordinate of the link connection point, $Y_M$ is vertical coordinate of the link connection point, $L_1$ is distance from the axis of the upper-step-side step link roller shaft to the link connection point, and $L_2$ is distance from the axis of the lower-step-side step link roller shaft to the link connection point.

5. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each link mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in an upper speed changing section and a lower speed changing section, wherein, when axes of adjacent step link roller shafts are in the lower speed changing section, and, assuming that relative coordinates in horizontal and vertical directions of the axes of the step link roller shafts are $(X_s, Y_s)$, that radius of curvature of a movement locus of the axis of the step link roller shaft in the lower curved section is $R_2$, that an inclination angle of the intermediate inclined section is $\alpha_m$, and that a point vertically spaced apart by $-R_1$ from a border point, which is in the movement locus of the axis of the step link roller shaft and between the lower landing section and the lower curved section, is the origin of a coordinate system, when $Y_s$ is in the following range:

$$R_2 \cos\alpha_m-\sqrt{\{(R_2 \cos\alpha_m)^2+(2R_2 \sin\alpha_m \cdot X_s-X_s^2)\}} \leqq Y_S<-R_2+\sqrt{(R_2^2-X_s^2)},$$

a relationship between relative positions of adjacent step link rollers in the lower speed changing section is expressed as $$X_1=[-p_3q_3+\sqrt{\{(p_3q_3)^2-(p_3^2+1)(q_3^2-R_2^2)\}}]/(p_3^2+1),$$

$$Y_1=\sqrt{(R_2^2-X_1^2)},$$

$$X_2=X_1+X_s,$$

and $$Y_2=Y_1+Y_S$$

where, $P_3=X_s/Y_s$, and $q_3=(X_s^2+Y_s^2)/2Y_s$, a horizontal coordinate of the axis of the upper-step-side step link roller shaft is $X_1$, a vertical coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$, and position of the link connection point is expressed by $$X_M=X_1+L_1\cos\{\beta-\gamma\},$$

and $$Y_M=Y_1+L_1\sin\{\beta-\gamma\}$$

where $\beta=\tan^{-1}\{(Y_1-Y_2)/(X_1-X_2)\}$, $\gamma=\cos^{-1}\{(L_1^2-L_2^2+W^2)/2L_1W\}$, $W=\sqrt{\{(X_1-X_2)^2+(Y_1+Y_2)^2\}}$, $X_M$ is horizontal coordinate of the link connection point;

$Y_M$ is vertical coordinate of the link connection point;

$L_1$ is distance from the axis of the upper-step-side step link roller shaft to the link connection point, and $L_2$ is distance from the axis of the lower-step-side step link roller shaft to the link connection point.

6. An escalator with a high speed inclined section comprising:

a main frame;

a main track on the main frame and forming a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section;

a plurality of steps, each of the steps having a step link roller shaft and a step link roller rotatable around the step link roller shaft for rolling on the main track, the steps being connected in an endless fashion to circulate along the loop track;

a plurality of link mechanisms, each like mechanism having a first link rotatably connected to the step link roller shaft and a second link rotatably connected to a link connection point of the first link and the step link roller shaft of an adjacent step for varying distance between the step link roller shafts through folding and unfolding;

a rotatable auxiliary roller in each of the link mechanisms; and an auxiliary track on the main frame for guiding movement of the auxiliary roller so the link mechanism folds and unfolds, changing movement speed of the steps in a lower speed changing section and a lower speed changing section, wherein, when axes of adjacent step link roller shafts are in the lower speed changing section, and, assuming that relative coordinates in horizontal and vertical directions of the axes of the step link roller shafts are $(X_s, Y_s)$, that radius of curvature of a movement locus of the axis of the step link roller shaft in the upper curved section is $R_2$, that an inclination angle of the intermediate inclined section is $\alpha_m$, and that a point vertically spaced apart by $R_2$ from a border point, which is in the movement locus of the axis of the step link roller shaft and between the lower landing section and the lower curved section, is the origin of a coordinate system, when $Y_s$ is in the following range:

$$-X_s\tan\alpha_m\leq Y_s<R_2\cos\alpha_m-\sqrt{\{(R_2\cos\alpha_m)^2+\{2R_2\sin\alpha_m\cdot X_s-X_s^2\}\}}$$

a relationship between relative positions of adjacent step link rollers in the lower speed changing section can be expressed by the following equations:

$$X_1=\{-(p_4q_4+p_4Y_s+X_s)+\sqrt{A_1}\}/(p_4^2+1),$$

$$A_1=(p_4q_4+p_4Y_s+X_s)^2-(p_4^2+1)\{(q_4+Y_s)^2-R_2^2+X_s^2\},$$

$$Y_1=p_4X_1+q_4,$$

$$X_2=X_1+X_S,$$

and $$Y_2=Y_1+Y_s$$

where, $p_4=-\tan\alpha_m$, and $q_4=-R_2(\cos\alpha_m+\sin\alpha_m\cdot\tan\alpha_m)$, a horizontal coordinate of the axis of the upper-step-side step link roller shaft is $X_1$, a vertical; coordinate of the axis of the upper-step-side step link roller shaft is $Y_1$, a horizontal coordinate of the axis of the lower-step-side step link roller shaft is $X_2$, and a vertical coordinate of the axis of the lower-step-side step link roller shaft is $Y_2$, and position of the link connection point is expressed by:

$$X_M=X_1+L_1\cos\{\beta-\gamma\},$$

and $$Y_M=Y_1+L_1\sin\{\beta-\gamma\}$$

where $\beta=\tan^{-1}\{(Y_1-Y_2)/(X_1-X_2)\}$, $\gamma=\cos^{-1}\{(L_1^2-L_2^2+W^2)/2L_1W\}$, $W=\sqrt{\{(X_1-X_2)^2+(Y_1-Y_2)^2\}}$, $X_M$ is horizontal coordinate of the link connection point, $Y_M$ is vertical coordinate of the link connection point, $L_1$ is distance from the axis of the upper-step-side step link roller shaft to the link connection point, and $L_2$ is distance from the axis of the lower-step-side step link roller shaft to the link connection point.

7. The escalator with a high speed inclined section according to claim 1, wherein a part of the first link has a bent configuration, and wherein, from relative positions of the adjacent step link rollers, the position of the axis of the auxiliary roller can be determined from $$X_N=X_1+V\cos\{\beta-\gamma-\delta\}$$

and $$Y_N=Y_1+V\sin\{\beta-\gamma-\delta\}$$

where $V=\sqrt{(L_1^2+L_3^2-2L_1L_3\cos\theta)}$, $\delta=\sin^{-1}(L_3\sin\theta/v)$, $X_N$ is horizontal coordinate of the axis of the auxiliary roller;

$Y_N$ is vertical coordinate of the axis of the auxiliary roller;

$L_3$ is distance from the link connection point to the axis of the auxiliary roller; and $\theta$ is an angle made by a segment connecting the axis of the step link roller shaft on the upper step side and the link connection point and the segment connecting the axis of the auxiliary roller and the link connection point.

* * * * *